(12) United States Patent
Keenan et al.

(10) Patent No.: US 6,577,631 B1
(45) Date of Patent: Jun. 10, 2003

(54) COMMUNICATION SWITCHING MODULE FOR THE TRANSMISSION AND CONTROL OF AUDIO, VIDEO, AND COMPUTER DATA OVER A SINGLE NETWORK FABRIC

(75) Inventors: Ronald M. Keenan, Oxford, CT (US); Thomas F. Barraza, Monroe, CT (US); Edward R. Caceres, Milford, CT (US); Joseph A. Deptula, Watertown, CT (US); Patrick A. Evans, Burlington, CT (US); Joseph Setaro, Danbury, CT (US)

(73) Assignee: Merlot Communications, Inc., Bethel, CT (US)

( * ) Notice: Subject to any disclaimer, the term of this patent is extended or adjusted under 35 U.S.C. 154(b) by 0 days.

(21) Appl. No.: 09/327,928

(22) Filed: Jun. 8, 1999

Related U.S. Application Data

(60) Provisional application No. 60/088,747, filed on Jun. 10, 1998.

(51) Int. Cl.[7] .......................... H04L 12/28; H04L 12/56
(52) U.S. Cl. ........................................ 370/394; 370/474
(58) Field of Search ................................ 370/389, 474, 370/493, 352, 465, 394

(56) References Cited

U.S. PATENT DOCUMENTS

| | | | |
|---|---|---|---|
| 4,707,831 A | 11/1987 | Weir, et al. | 370/94 |
| 4,782,485 A | 11/1988 | Gollub | 370/118 |
| 4,914,650 A | 4/1990 | Sriram | 370/60 |
| 5,361,261 A | 11/1994 | Edem et al. | 370/85.3 |
| 5,384,766 A | 1/1995 | Yamato et al. | 370/84 |
| 5,396,490 A | 3/1995 | White et al. | 370/60 |
| 5,432,790 A | 7/1995 | Hluchyj et al. | 370/95.1 |
| 5,440,545 A | 8/1995 | Buchholz et al. | 370/60 |
| 5,497,371 A | 3/1996 | Ellis et al. | 370/60 |

FOREIGN PATENT DOCUMENTS

| | | | | |
|---|---|---|---|---|
| EP | 0 596 652 A1 | 5/1994 | | H04L/12/64 |
| EP | 0 707 432 A | 4/1996 | | H04Q/11/04 |

Primary Examiner—Ajit Patel
Assistant Examiner—Chirag Shah
(74) Attorney, Agent, or Firm—William C. Crutcher

(57) ABSTRACT

A communications switching module (CSM) serving as common switching equipment for work stations in a star-topology Ethernet local area network. Both voice and data are incorporated in master Ethernet packets which are transmitted at a constant rate. The CSM switches the voice signals synchronously over a time domain multiplexed highway and separately switches the data signals asynchronously over a high speed packet bus.

10 Claims, 11 Drawing Sheets

COMMUNICATION SWITCHING MODULE FOR THE TRANSMISSION AND CONTROL OF AUDIO, VIDEO, AND COMPUTER DATA OVER A SINGLE NETWORK FABRIC

CROSS REFERENCE TO RELATED APPLICATIONS

This application claims the benefits of prior filed, provisional application Ser. No. 60/088,747 filed Jun. 10, 1998.

FIELD OF THE INVENTION

This invention relates to the field of telecommunications and data communications over a network and, more particularly, to an improved communication switching module for switching integrated voice and data communications over a local area network.

Today, the typical office communications infrastructure consists of two independent networks: the telecommunications network and data communications network. The telecommunications network provides circuit switched channels with limited bandwidth (typically 64 Kbps to 128 Kbps). The circuit switched nature and limited bandwidth of this network cannot support today's high-speed data transport requirements. The office data communications network provides packet transport (Ethernet or Token Ring) via hubs and/or switches and, to a much lesser degree, cells in Asynchronous Transfer Mode (ATM). These data communications networks provide bandwidths to the desktop of 10 Mbps to 100 Mbps. However, the packet nature of these networks presents an impediment to the transport of delay sensitive data such as real-time audio or video, with the exception of ATM, which is not economically feasible to deploy to the desktop today.

Data transmission, voice and videoconferencing are converging and all will be provided over a single network fabric. The miracle that is really driving this convergence is the exponential improvement in chip technology. Products based on innovative new chip designs will soon provide for all the data, audio and video communications needs of the office using a single connection to each desktop. Office systems which unify voice, video and data communications, reducing the cost of ownership and allowing shared high speed Internet/Web access directly to the desktop are on the horizon. These products will offer a high quality alternative to existing stand-alone voice, videoconferencing and data networking equipment. These products will benefit users who want the convenience and utility of a Digital Key Telephone system or PBX along with the added advantage of a fully-integrated Local Area Network (LAN), and high-speed Wide Area Network (WAN) access, all housed within one system.

BACKGROUND OF THE INVENTION

Local Network Link Operation for a Traditional Digital Key/Hybrid Telephone System A traditional Digital Key/Hybrid Office Telecommunications System consists of two (2) major components: 1) the Digital Key Telephone instrument; and 2) the Common Equipment Unit (i.e., the back room or wiring closet equipment) which interconnects the Digital Key Telephones and the external Central Office (C.O.) lines.

The typical office internal telecommunications network uses a "Star Wiring Topology", consisting of "home run wiring", where each individual telephone is connected back to the Common Equipment Unit (CEU) on a dedicated Unshielded Twisted Pair (UTP) cable.

There is an important distinction to be made here between an industry standard analog 2500 type telephone (i.e., Touch Tone® Telephone) connected to a PBX (the type of CEU) and an electronic Digital Key Telephone connected to a PBX. Like the electronic Digital Key telephone, the analog 2500 type telephone is connected to the PBX by "home run wiring", forming a "Star Wiring Topology", where each individual telephone is connected back to the PBX on a dedicated UTP cable. However, the analog 2500 type telephone uses "in-band" audio channel signaling to communicate to the PBX.

Analog PBX Signaling Methods:

The analog 2500 type telephone is connected to the PBX over the Unshielded Twisted Pair (UTP) cable using an industry standard "Loop Interface". The telephone loop interface port (station port) on the PBX provides a source for "DC Loop Current" and an analog signal channel bandwidth from 300 Hz to 3,400 Hz for audio signal transmission. The standard loop interface provides for two types of signaling to the Common Equipment Unit (CEU) over the UTP cable: 1) Hook Switch State and 2) In-Band DTMF (Dual Tone Multi Frequency) Signals.

When the analog 2500 type telephone is "On Hook", it is in the idle state and no DC loop current is flowing between the associated PBX Station Port and the telephone. When the handset of the analog 2500 type telephone is lifted from its cradle (i.e., goes "Off Hook"), the "Hook Switch" contact is closed and DC loop current flows between the PBX Station Port and the telephone. The loop interface circuitry at the PBX station port monitors the status of the DC loop current (i.e., no loop current flowing; or loop current flowing within an acceptable range) to determine the state of the analog 2500 type telephone connected to the PBX station port by the UTP cable. No loop current flowing indicates that the telephone is in the "Idle On Hook State" and requires no servicing. The detection of DC loop current flowing, within an acceptable range, indicates that the telephone has gone "Off Hook" and requires servicing.

Through the "On Hook" and "Off Hook" states produced by the analog 2500 type telephone, and the detection thereof by the associated PBX station port, the telephone can communicate (i.e., signal) to the PBX that it requires service. Now that the telephone has signaled to the PBX that it needs to be serviced, it needs a means to communicate to the PBX what type of service it requires. The type of service request is communicated using "in-band" DTMF Signaling. As previously described, the loop interface provides a 300 Hz to 3,400 Hz bandwidth audio channel between the analog 2500 type telephone and the associated PBX station port. The telephone contains a DTMF signal generator and the PBX station port has access to a DTMF signal detector. The DTMF signaling scheme comprises a base of sixteen (16) unique digits, or characters. The composite spectrum of the DTMF signals fall within the 300 Hz to 3,400 Hz bandwidth audio channel allowing the DTMF digits to be transmitted over the loop interface for communicating service requests and address signaling to the PBX. Once the DTMF signal transmissions have subsided, the audio channel bandwidth is available for the transmission of voice signals. Hence the term "in-band" signaling, where the same channel bandwidth is used to transport both the DTMF signaling information and the voice signal information.

Digital Key Telephone PBX Signaling and Switching Methods

The commercially available systems today use vendor proprietary communications links to transport the digitized voice and telephone control signaling between the proprietary Digital Key Telephone and Common Equipment Unit (CEU) over the Unshielded Twisted Pair (UTP) cable. Typically, equipment vendors transport two (2) full-duplex 64 Kbps Bearer Channels and one (1) full-duplex 16 Kbps Signaling D Channel (2B+D) over the communications link between the telephone and the CEU. The two 64 Kbps B Channels are used to support circuit switched digitized voice, or circuit switched data transport, channels. The 16 Kbps D Channel is used to transport telephone control signaling packets and low speed data (e.g., ASCII character transmission from the CEU to the telephone LCD display).

The two (2) 64 Kbps B Channels are capable of transporting digitized voice in the form of 8 Bit PCM (Pulse Code Modulation) words, or other 8 bit digital data synchronously formatted to these Time Domain Multiplexed (TDM) channels. In both cases, the transport of information in a B Channel is on circuit switched bases. The nature of the circuit switched connection is that it is set up when there is information to transport. It provides a constant bandwidth (in this case 64 Kbps per B Channel) and this constant bandwidth is available for the duration of the connection. Finally, the connection is torn down when it is no longer required. This actually describes the typical telephone call. A telephone number is dialed, the connection is made, and a conversation is held for some period of time. The connection is torn down when the conversation has been completed by the user going on hook. Therefore, the B Channels of the Digital Key Telephone are only active when there is a voice or data call in progress. The B Channels are inactive when the telephone is in the idle state.

The electronic Digital Key Telephone uses out-of-band binary signaling bits via the D Channel to exchange signaling packets with the CEU. The signaling packets are used to transport Lamp Status (Key LED States; On, Off, Flash Rate, etc.) and telephone control commands (CODEC Power UP, Speaker On, Enable Speaker Phone Mode, etc.) from the CEU to the telephone. The D Channel signaling packets sent from the telephone to the CEU are used to transport the Telephone Type Identifier, Hook Switch Status and Key Closure information. Unlike the circuit switched connections supported by the B Channels, the D Channel is always active.

When the telephone is idle, the CEU must still have the ability to send status information to the telephone. For example, the CEU must send Lamp Status commands to the telephone in order for the telephone electronics to update the state of the LEDs under the line keys on the telephone. This is necessary because the idle Multi-Line Digital Key telephone must display the status of the incoming lines (Idle, Busy, Ringing, Hold, etc.) by appropriately illuminating the LED under the associated line key. In addition, the CEU needs a means to communicate to an idle telephone that it has an incoming call, i.e., to transmit the commands to turn on the telephone speaker and produce a ringing sound. Likewise, an idle telephone must have a means to communicate to the CEU that it requires servicing, i.e., that it has gone off hook or has selected an outside line on which to make a call.

Telecom/Data Network Integration

The integration of audio, video and computer data for transmission over a single network has been proposed in the past by a number of authors. Proposals have been advanced for transmitting and receiving packetized voice and data with predesignated time slots within each frame and which share the channel capacity, but giving some form of priority to the delay sensitive voice packets. Proposals have also been advanced for accommodating both isochronous (e.g., video) and non-isochronous (e.g., data) over an isochronous network by replacing standard packet (i.e., 10Base-T Ethernet) transmission techniques with synchronous Time Domain Multiplexed (TDM) transmission scheme. This requires proprietary and complex interface circuitry to be inserted between the standard Ethernet or Token Ring Media Access Controller (MAC) and the physical transmission media. However, the prior art has not fully addressed the integration of telecom and data in the context of the requirements of a small to mid-size office, typically having personal computers, workstations, servers, printers, etc., connected through Unshielded Twisted Pair (UTP) cable in a LAN using standards-compliant packets such as Ethernet, and also having a Digital Key/Hybrid Telephone System with telephone handsets connected to the Common Equipment Unit (CEU) by a separate UTP cable system. Some of the issues and problems in integrating the two networks are addressed below.

The typical office internal telecommunications network uses a "Star Wiring Topology". A 10Base-T or 100Base-TX Ethernet LAN deployed in the small to mid-size office uses a similar "Star Wiring Topology". Each individual Personal Computer (PC), Workstation or other Ethernet-supported device, is connected to an Ethernet Hub/Switch using a dedicated UTP cable, i.e., "home run wiring". However, the required quality of the UTP cable is a function of the network transmission speed used. 10Base-T Ethernet, which provides a transmission speed of 10Mbps, uses Category 3 cable or higher; 100Base-TX Ethernet provides 100 Mbps on Category 5 cable as well as other physical media such as fiber.

Integrating the Digital Key/Hybrid Telephone system with an Ethernet LAN is enabled under the present invention by using Ethernet packets to transport the B Channel and D Channel information to a common device performing the function of a CEU. This packet transmission method is not an issue for the telephone control signaling packets traditionally transported over the D Channel. However, the B Channels provide transmission of Constant Bit Rate (CBR), circuit switched information. Therefore, transforming the B Channels into standard Ethernet packet transmissions requires some form of CBR, circuit switched, channel emulation, which is one feature of the present invention.

The other major difference to be contended with in providing for the 2B+D transmissions of the Digital Key Telephone operating over the Ethernet LAN is the dedicated vs. shared communications link between stations and the common equipment. It was previously noted that the traditional office telecommunications network and the 10Base-T or 100Base-TX Ethernet LAN both use a physical "Star Wiring Topology" to connect stations to the common equipment (i.e., Telecommunications Switch or Ethernet Hub/Switch respectively). However, most telecommunications networks use this network topology to form dedicated point-to-point transmissions between the common equipment and a single station instrument. Ethernet, on the other hand, allows for the transmission of information from multiple station devices attached to a single Ethernet segment.

In the case of 10Base-T and 100Base-TX Ethernet, each station device is connected back to a Hub or Switch by a dedicated UTP cable. Ethernet Hubs are repeater devices, duplicating the signal transmissions received on one station cable to all other station cables connected to the Hub, producing a single shared Ethernet segment for all station devices. The result is the generation and flow of traffic from multiple sources on the same communications link. Ethernet Switches also act as repeating devices, but are selective repeating devices. An Ethernet Switch reads the destination address from the packet header being received on an ingress port and directs the packet only to the associated egress port (or ports, in the case of multicast). The other ports on the switch will not have the packet information transmitted to them, providing an isolated Ethernet segment for each port on the switch. However, the networking topology does allow for a Hub to be connected to a port on a Switch in order to expand the number of network users. Again, the result is the generation and flow of traffic from multiple sources (i.e., all of the stations connected to the Hub) entering a single port on the switch. The expansion capability of the networking technology requires an integrated Digital Key/Hybrid Telephone system and Ethernet LAN to support multiple Digital Key Telephone terminals attached to a single Ethernet LAN segment. This places on an integrated voice/data common device performing the same function as a CEU the additional task of identifying the individual traffic flow types entering a single system port and directing the individual flows to their appropriate destination.

Digital Key Telephone Signaling Requirement

The operation of the traditional Digital Key/Hybrid telephone system depends upon the control signaling transmissions between the telephone and the Common Equipment Unit (CEU). These signaling transmissions provide the communications link between the Call Processing/Feature software executing on the system CPU and the requests made by the user through the Dial Pad and Feature Keys on the telephone. An independent communications link of this type is required between each Digital Key Telephone and the system CPU in the CEU. These independent communications links in the prior art separate telephone network are supported over the individual dedicated point-to-point cable connections between each Digital Key Telephone and CEU station port interface. It is important to note here that only one (1) signaling channel flows over any individual station cable. Therefore, each physical station port in the system has a dedicated signaling channel. This provides for a relationship between the physical station port and the station signaling channel for the telephone connected to that port, providing a means for the system software to uniquely identify the associated telephone.

A dedicated signaling channel to each telephone is required to provide a communications link between the Call Processing/Feature software and the requests made by the user through the Keys on the telephone. In the case of multiple Digital Key Telephones connected back to the common equipment to be described over an Ethernet segment, there is not the direct association of the physical system port for defining a signaling channel dedicated to a telephone. Therefore, the establishment of more sophisticated logical signaling channel links to multiple telephones over an Ethernet segment is enabled under the present invention for the exchange of signaling information between the individual telephones and the system CPU in the common device performing the function of the CEU. The method and apparatus for establishing such links is another feature of the present invention.

Quality of Service (QoS) Requirement for Delay Sensitive Data

The most significant element in providing for the transmission of data, voice and videoconferencing over a single network fabric is that of the transport control techniques required to provide the guaranteed Quality of Service (QoS) for audio, video and other delay sensitive data. Depending on the application, bandwidth in and of itself may not be the dominant issue. For example, why should there be any concern about bandwidth when transporting a 64 Kbps digitized voice (PCM) channel over a 10 MBps Ethernet segment? Surely there is enough available bandwidth to transport the 64 Kbps PCM information over the segment. Unfortunately, contention between real-time audio and/or video applications and computer file transfer applications for access to the LAN segment causes a problem with real-time transmissions. This contention causes unacceptable latencies to be encountered by packets carrying delay sensitive data, queued waiting to enter the media, while file transfer packets are using the media. This is of particular concern in the case of 10 Mbps Ethernet (10Base-T), where computer file transfers can be using the maximum Ethernet packet size of 1518 bytes. Accounting for the Preamble, Start of Frame Delimiter (SFD) and the Inter-Packet Gap (IPG), a single maximum size packet will occupy the media for 1.23 ms. The latency caused by the transmission of these maximum size packets rapidly consumes the Round-Trip Echo Path Delay specification of 2.0 ms for Digital to Digital Connections in a Digital Key/Hybrid telephone system.

Additional latency can be introduced to packet transmissions by the Ethernet media access control characteristics for the Carrier Sense Multiple Access with Collision Detection (CSMA/CD) access method. Packet collisions on the media caused by the asynchronous transmissions from multiple station devices attached to the media require the retransmission of corrupted packets. When a collision is detected, the transmitting stations back off, select a random delay, execute the delay and transmit again. This process of detecting collisions and re-transmitting packets increases the latency for all packets traversing the network. Packet collisions and the resulting increased latency become a significant problem in poorly designed or over-subscribed networks (i.e., networks improperly deployed or networks with too many users per segment).

Our proposed Switched Ethernet implementation of an integrated voice/data system reduces the latencies caused by packet collisions on the media and assists in developing a QoS transport technique by isolating collision domains. Switched Ethernet improves network productivity by segmenting network traffic and providing private 10 Mbps (10Base-T) or 100 Mbps (100Base-TX) access to the desktop. However, the requirement for a truly integrated communications system is to provide for all communications needs over a single network fabric to the desktop. The single connection to the desktop dictates that, as a minimum, a Digital Key Telephone and the user's computer or Workstation must share the same LAN segment to the desktop. Therefore, working in a Switched Ethernet environment may greatly improve, but does not eliminate, the problem of having multiple station devices generating independent, and in this case incompatible, traffic streams over the same LAN segment.

Packet queuing delays within the Ethernet Switch also add latency to packet transmissions producing an additional impairment to providing a guaranteed QoS for delay sensitive data. Traditional switch designs have used First-In-First-Out (FIFO) queuing to order the flow of traffic through the switch. Packets leaving a port are organized in the order in which they were received. No special treatment is given to packets from traffic flows that are of higher priority or are more delay sensitive. If a number of packets from different traffic flows are ready to forward, they are handled strictly in FIFO order. When a number of smaller packets are queued behind a longer packet, then FIFO queuing results in a larger average delay per packet than if the shorter packets were transmitted before the longer packets. Guaranteed QoS is not something that is practically supported with the FIFO queuing model.

A number of switch designs have implemented multiple output queues and scheduling algorithms like Weighted Fair Queuing (WFQ), to determine when a packet needs to be serviced in order to improve individual traffic flows. However, traffic from different flows interfere with one another and just adding a priority FIFO queue does not isolate the behavior of each traffic flow. When congestion occurs, the scheduling algorithm must distribute multiple priority traffic flows through the priority FIFO queue, again introducing the latencies associated with the traditional FIFO queuing model. If on the other hand, the switching mechanism provides for prioritizing traffic flows through dynamically allocated flow queues dedicated to each active traffic flow, serviced by priority scheduling algorithms, the inherent problems with the FIFO queuing model are resolved. This scheme allows for traffic streams to be forwarded from the switch independently of the order in which the packets arrive. When the switch has more bandwidth than traffic requires, all traffic can be serviced equally. However, when congestion occurs, the priority scheduling algorithms ensure that packet streams are forwarded according to their minimum guaranteed QoS parameters. It is important to note that either Layer 2 or Layer 3 protocols can be used to establish and control the Priority Flow Queues. This allows for the development of very versatile and powerful switching algorithms.

Developing an integrated voice/data communications system based on state of the art Ethernet Switching technology provides private 10 Mbps (10Base-T) or 100 Mbps (100Base-TX) access to the desktop with individually regulated traffic flows. Versatile switching and scheduling algorithms can be implemented to provide a guaranteed delay QoS for individual packet streams through the switch. However, the incremental resolution of the traffic flow control is limited to a discrete packet base. Mixed simultaneous traffic flows of large packets carrying computer file transfer information and small packets carrying delay sensitive information, on a limited bandwidth port (e.g., 10 Mbps), still present an impairment to providing a guaranteed QoS for the delay sensitive information.

OBJECTS OF THE INVENTION

In view of the foregoing, it is an object of this invention to provide a method and apparatus for the transmission of audio, video and packet data over a single network fabric using a synchronous low delay transport path to ensure Quality of Service (QoS) for delay sensitive information.

It is another object of this invention to provide a method and apparatus for the transmission of audio, video and packet data over a single network link between user terminal equipment and common switching equipment using a synchronous low delay transport path encapsulated into Ethernet frames.

It is yet another object of this invention to provide a method and apparatus for the automatic setup of a Permanent Virtual Connection (PVC) for the transmission of signaling and control information over a single network link between user terminal equipment and common switching equipment using Ethernet frames, in which a dedicated individual PVC is established for each user terminal connected to the common network link.

It is yet another object of this invention to provide a method and apparatus for the automatic reservation of a Time Domain Multiplexed (TDM) Flow Queue within a Communications Switching Module (CSM) providing for the conversion of delay sensitive data, encapsulated in Ethernet frames received from an ingress port of the Ethernet Switching device, to synchronous digital bytes sequenced into TDM time slots for transmission on a TDM Highway. The complementary aspect of this object of the invention is to provide a method and apparatus for sequencing digital bytes from synchronous TDM time slots on a TDM Highway into a reserved TDM Flow Queue within a CSM for encapsulation into Ethernet frames for transmission out an egress port (or ports, in the case of multicast) of the Ethernet Switching device.

It is yet another object of this invention to provide a method and apparatus for routing call set up information over a Permanent Virtual Connection (PVC) through a reserved Time Domain Multiplexed (TDM) Flow Queue within a Communications Switching Module (CSM). The PVC runs between a microcomputer in the CSM and the User Terminal Equipment (UTE) attached to the Ethernet LAN segment connected to the associated port on CSM.

It is yet another object of this invention to provide a method and apparatus to reuse the same Permanent Virtual Connection (PVC) carrying signaling, control and call set up information through a reserved Time Domain Multiplexed (TDM) Flow Queue within an Ethernet Switching device to carry delay sensitive information using a controlled delay Quality of Service (QoS) mechanism for the delay sensitive information.

It is yet another object of this invention to provide a method and apparatus to transport delay sensitive information over an Ethernet LAN segment using a Constant Bit Rate (CBR) channel of scalable bandwidth encapsulated into standards-compliant Ethernet frames, said CBR channel being extensible to and transportable over the Wide Area Network (WAN) through an appropriate WAN interface device.

It is yet another object of this invention to provide a method and apparatus for the establishment of a fixed rate timing reference signal to be used for the recovery and synchronization of real-time data over a non-isochronous media.

SUMMARY OF THE INVENTION

Briefly described, the present invention comprises apparatus for the transport and control of delay sensitive information (e.g., audio/video) and non-delay sensitive information (e.g., computer data) over a single network fabric, providing controlled Quality of Service (QoS) characteristics for the delay sensitive information. A Communications Switching Module (CSM) is provided, which performs all of the functions of a conventional Ethernet Switch, as well as functions of a conventional telecommunications Common Equipment Unit (CEU), and is further enhanced to provide Time Domain Multiplexed (TDM) synchronizing and scalable bandwidth Constant Bit Rate (CBR) circuit switched channel emulation. A series of Master Ethernet Packets are used to encapsulate delay sensitive information and user data packet information for transport over a LAN segment between a CSM and a User Terminal Equipment (UTE) Adapter.

The CSM and the UTE Adapter both employ Ethernet Segmentation and Re-assembly (SAR) mechanisms to sequence delay sensitive information between the Master Ethernet Packets and TDM Flow Queues. The Ethernet SAR function also sequences the user data packet information between the Master Ethernet Packets and the User Packet Flow Queues. On the user port interface of the CSM this Ethernet SAR mechanism generates, formats and transfers the Master Ethernet Packets to the Media Access Controller (MAC) for transmission over the LAN segment. Master Ethernet Packets received by the user port interface MAC are processed by the Ethernet SAR mechanism to extract the delay sensitive information and user data packet information. The TDM Highway Interface of the CSM sequences delay sensitive information between the TDM Flow Queues and the TDM Highway time slots. The High-Speed Packet Interface of the CSM sequences data packets between the User Packet Flow Queues and the High-Speed Packet Bus.

DETAILED DESCRIPTION OF THE PREFERRED EMBODIMENTS OF THE INVENTION

Overall Description

Figure 1:
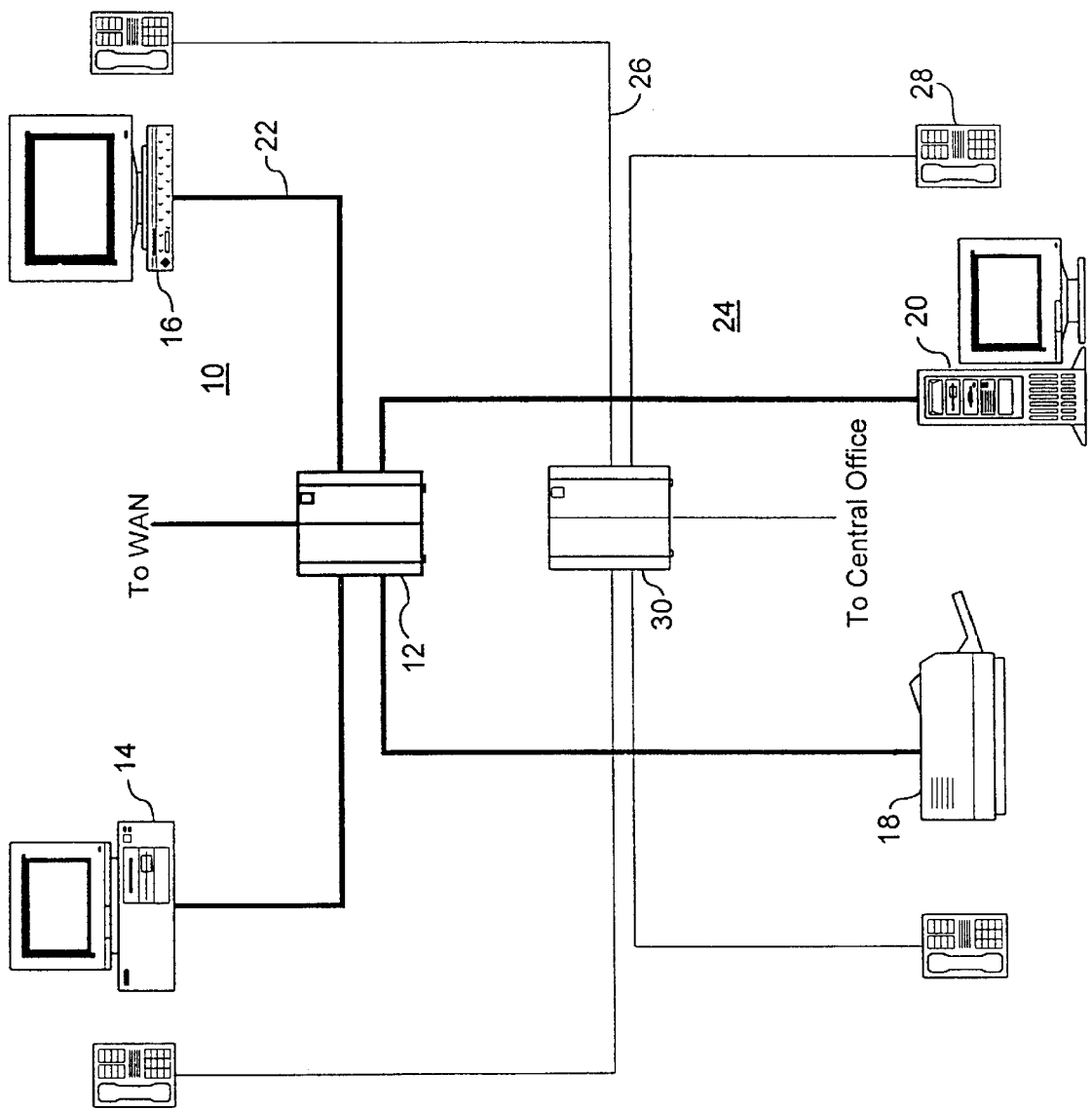
FIG. 1 is a simplified schematic drawing of a prior art small office, equipped with an Ethernet LAN, along with a PBX digital telephone system.

FIG. 1 illustrates a prior art arrangement of a typical small office having an Ethernet LAN shown generally at 10 connected in "Star Wiring Topology" from an Ethernet hub 12 to a PC 14, workstation 16, printer 18 and server 20 with Unshielded Twisted Pair (UTP) cable 22. A separate traditional digital key/hybrid office telecommunications system, illustrated generally at 24, is connected by UTP cable 26 in a similar "Star Wiring Topology" to digital key telephone instruments such as 28, which access the central office from Common Equipment Unit (CEU) 30.

Figure 2:
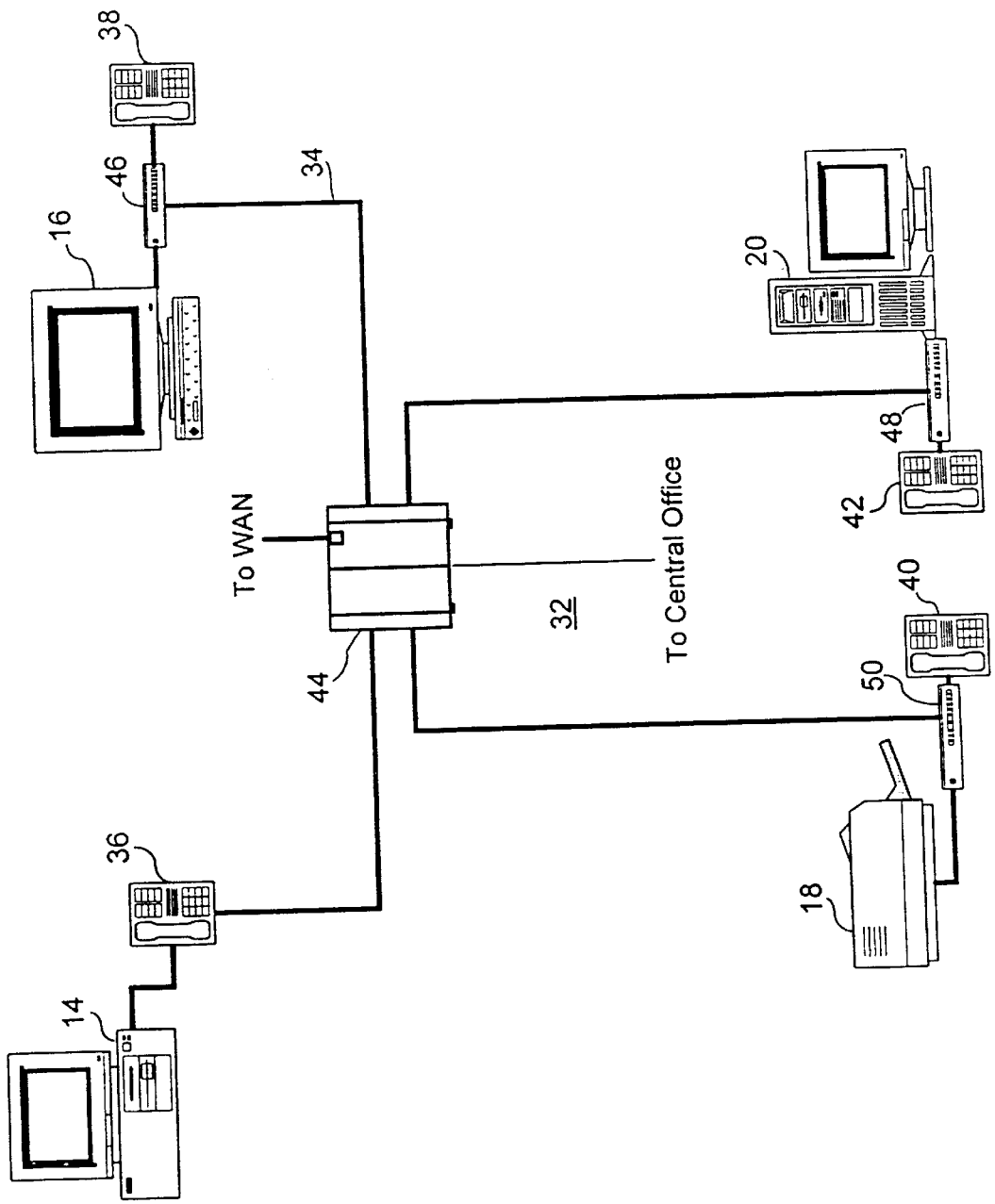
FIG. 2 is a simplified schematic diagram of same office with voice and data transmission and control integrated over a single network according to the present invention.

In accordance with the present invention, illustrated in simplified form in FIG. 2, a single network shown generally at 32 for integrated transmission and control of audio, video and computer data is connected in "Star Wiring Topology" over UTP cable 34 to assorted user terminal equipment, such as the previously described PC 14, workstation 16, printer 18 and server 20, as well as to modified Digital Key Telephone instruments 36, 38, 40, 42. Data and voice are transmitted and controlled in the format of Ethernet Standard Packets from a Communications Switching Module (CSM) 44 through User Terminal Equipment (UTE) Adapters shown at 46, 48, 50. The UTE Adapters may be incorporated into the digital telephone instrument as indicated by instrument 36, in which case the PC may be plugged directly into a suitable receptacle on the telephone instrument.

The systems shown in FIGS. 1 and 2 are rudimentary and it will be understood that the networks are in many cases much larger, with many more items and types of user terminal equipment. However, the illustrated system has been limited in order to simplify the explanation.

The CSM 44 will be described in detail in connection with its functions shown in FIG. 3 in conjunction with a single UTE Adapter shown as 46 (also shown in FIG. 2). FIG. 4 illustrates one possible embodiment of CSM 44 describing the Time Domain Multiplexed (TDM) Highway and packet bus structure. The CSM 44 shown in FIG. 4 includes all of the functions of a conventional Ethernet switch, along with a Constant Bit Rate (CBR) processing module 52, a number of identical Ethernet switch cards 54, a number of standard Wide Area Network (WAN) interface cards 55, and an Ethernet switch fabric card 56, preferably using a cut-through switch. The switch cards 54 each have 8 user ports and the WAN interface cards 55 have system ports for connection to other system modules.

Ethernet switch cards 54 and WAN interface cards 55 all internally communicate with Ethernet switch fabric card 56 via high speed packet interface 62. Switch cards 54 and WAN interface cards 55 also all internally communicate with the CPU of CBR processing module 52 via Time Domain Multiplexed (TDM) synchronous full-duplex highway structure 64.

Figure 3:
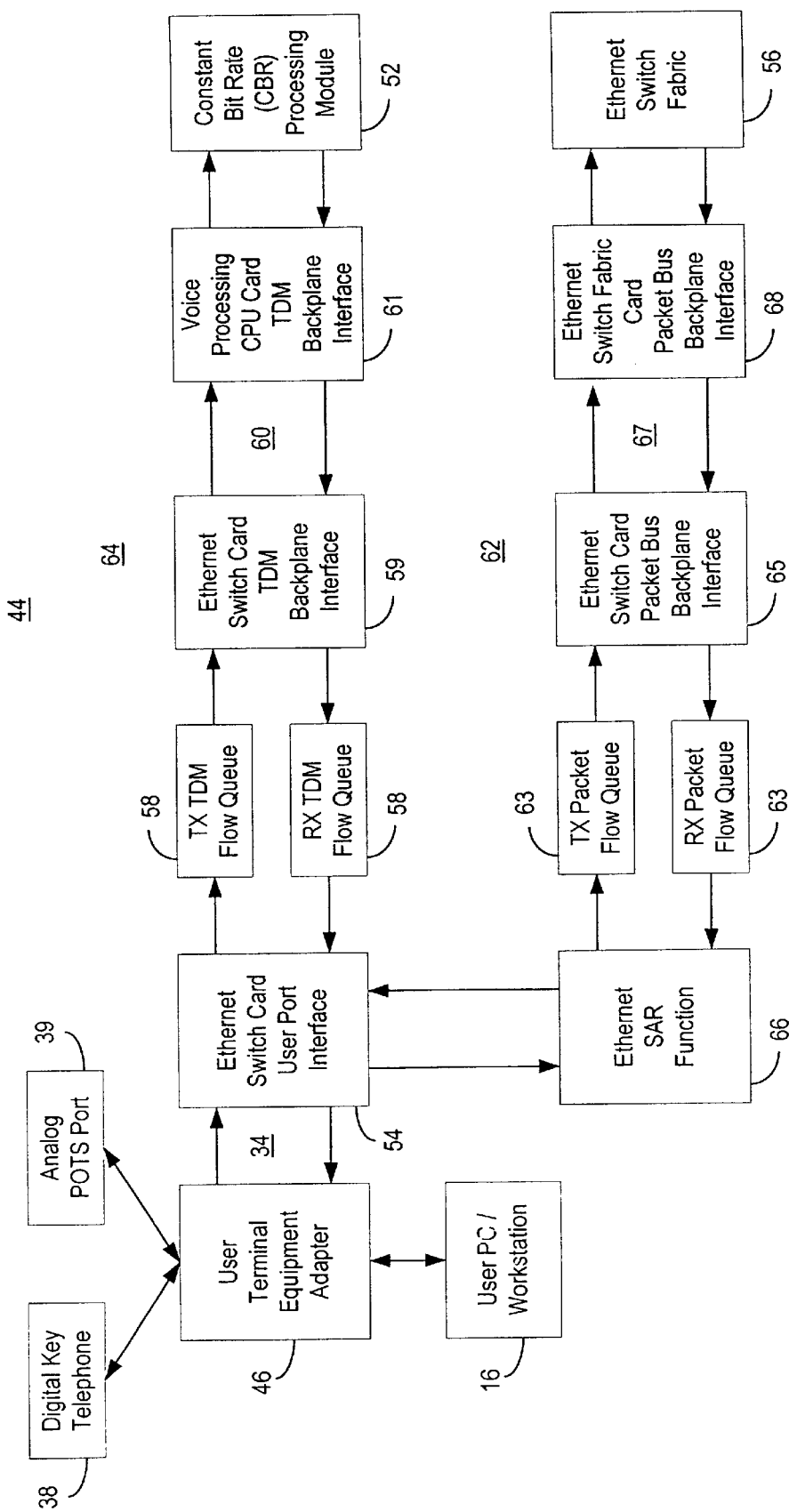
FIG. 3 is a functional block diagram of the Communications Switching Module (CSM) connected by one LAN segment to User Terminal Equipment (UTE) showing the transport paths for delay sensitive data (i.e., voice) and user packet data through the system.
Figure 4:
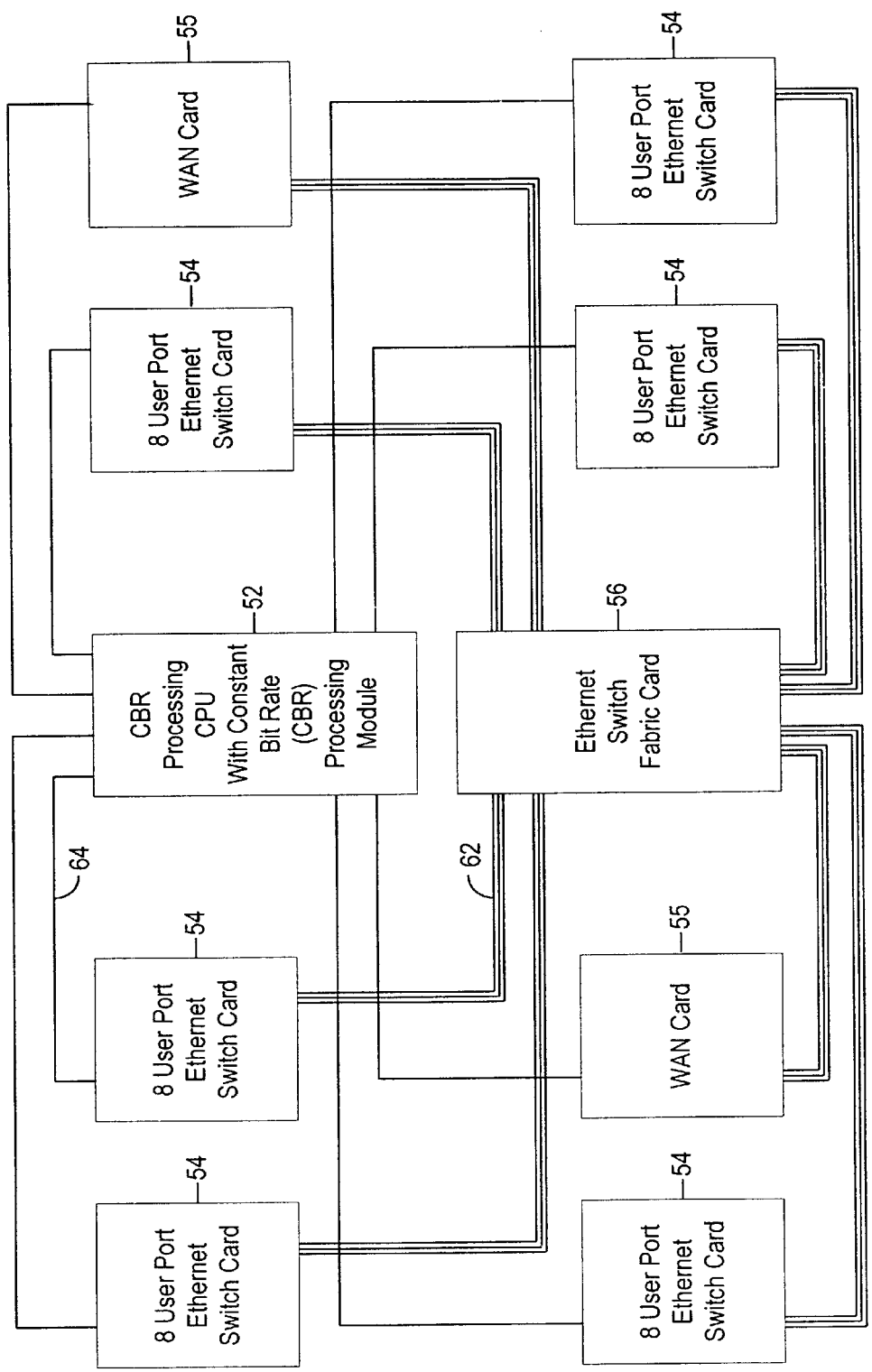
FIG. 4 is a block diagram of the Communications Switching Module (CSM) showing the interconnection of multiple Ethernet Switching Cards, and/or multiple Wide Area Network (WAN) interface cards, via Time Domain Multiplexed (TDM) Highways and high-speed Packet Buses to the Constant Bit Rate (CBR) Processing CPU and Ethernet Switch Fabric respectively.

Referring to FIG. 3, one user port of Ethernet switch card 54 and one network port of User Terminal Equipment (UTE) adapter 46 are shown connected through a single LAN segment 34. The UTE adapter 46 services a digital key telephone 38 and a user PC work station 16. It may also service an analog POTS port 39.

The user port of Ethernet switch card 54 is integrated with an Ethernet Segmentation and Reassembly (SAR) function 66 to be described later in detail, which processes delay-sensitive information over TDM highway 64 and non-delay sensitive user data over packet interface 62.

The TDM highway 64 consists of TX and RX TDM flow queues 58, an Ethernet switch card/TDM backplane interface 59, TX and RX TDM backplane 60, and voice processing CPU card/TDM backplane interface 61.

The high speed packet interface 62 consists of TX and RX packet flow queues 63, Ethernet switch card/packet bus backplane interface 65, a TX and RX high speed packet bus backplane 67, and Ethernet switch fabric card/packet backplane interface 68.

The various functions performed by the system will now be described in conjunction with the block diagrams of FIGS. 3, 4, 5 and 6.

Permanent Virtual Connection (PVC) for CBR Channel Transport

The LAN segments connected to the Ethernet ports on Ethernet Switch Port Cards 54, in the Communications Switching Module (CMS) 44 are required to support traffic flows from multiple station devices. Therefore, the common equipment must have a means of uniquely identifying the individual station devices connected to the segment. The Ethernet standards provide a means for uniquely identifying station devices through the use of MAC (Media Access Controller) addresses. The MAC is part of the interface circuitry at each "Media Access" point, and each MAC is assigned a unique address.

In one possible embodiment of the invention, a Digital Key Telephone 38 is modified, so that when it is initially attached through a User Terminal Equipment (UTE) Adapter 46 to an Ethernet LAN segment 34, the UTE Adapter will broadcast, or multicast, a packet containing its MAC Source Address (SA) and information pertaining to its device type carried in a higher level protocol header encapsulated into the standard Ethernet packet. During this initialization mode of operation the packets transmitted by the UTE Adapter are standard Ethernet packets, not the Master Ethernet Packets proposed by the present invention. The port on the Ethernet Switch Port Card 54 servicing that LAN segment receives the packet, recognizes it as a broadcast, or multicast, packet from its MAC Destination Address (DA) field, reads the MAC SA and searches its local address table for a match. If the MAC SA is not found in the local address table, the indication is that a new device has been attached to the LAN segment. The Ethernet Switch Port Card examines packets that arrive at ingress ports that do not have an entry in the local address table more closely. The Ethernet Switch Port Card reads further into these packets and looks for the UTE Adapter device type carried in a higher level protocol header. If the higher level protocol header and UTE Adapter device type are recognized, a Time Domain Multiplexed (TDM) Flow Queue 58 is reserved for the UTE Adapter packet traffic. The local address table is then updated with the new MAC SA of the UTE Adapter and an identifier for its assigned TDM Flow Queue is added to the table entry. If after reading further into the packet, the Ethernet Switch Port Card does not recognize the higher level protocol header for carrying the UTE Adapter device type, the local address table is updated with the new MAC SA of the packet. The packet is then processed as a standard Ethernet data packet.

At this point in the initialization process, the Ethernet Switch Port Card has recognized the attachment of the UTE Adapter to the LAN segment and has reserved a TDM Flow Queue 58 for its Constant Bit Rate (CBR) channel information. However, the CBR Processing CPU card 52 executing the CBR Channel Processing Software is still unaware that a new UTE Adapter has been attached to the LAN segment. The reserved TDM Flow Queue is sized for a default CBR channel bandwidth which is used to pass the new UTE Adapter packet information on to the CBR Processing CPU card. The Ethernet Switch Port Card parses the standard Ethernet header from the UTE Adapter packets and places the CBR channel payload information into the reserved TDM Flow Queue (note that this payload information includes the higher level protocol header encapsulated into the standard Ethernet packet by the UTE Adapter). The packet payload information is then sequenced from the TDM Flow Queue and transmitted in a synchronous time slot on the associated system TDM Highway 60 to the CBR Processing CPU card 52 executing the CBR Channel Processing Software.

The CBR Processing CPU receives the packet payload information and verifies that the device type is a UTE Adapter. This establishes a simplex connection path, through a TDM Flow Queue 58, from the UTE Adapter 46 to the CBR Processing CPU 52. It is not necessary to pass the Ethernet Switch Port Card number or the MAC SA of the UTE Adapter (i.e., the standard Ethernet header) to the CBR Processing CPU. The CBR Processing CPU communicates with each Ethernet Switch Port Card over an independent TDM Highway, thereby identifying an Ethernet Switch Port Card by the TDM Highway transmitting the information. The CBR Processing CPU further identifies the individual UTE Adapter by the time slot on the TDM Highway transmitting the information. Following the link further back, the TDM Highway time slot is associated with a reserved TDM Flow Queue on the Ethernet Switch Port Card which is related to the UTE Adapter MAC SA by its entry in the local address table of the Ethernet Switch Port Card.

The CBR Processing CPU 52 then acknowledges that it has detected a new UTE Adapter connected to the system by transmitting signaling information to that UTE Adapter in the appropriate time slot on the TDM Highway 60 of the associated Ethernet Switch Port Card. This signaling information is formatted with the higher level protocol header, ready to be encapsulated into a standard Ethernet packet by the Ethernet Switch Port Card. The Ethernet Switch Port Card receives the signaling information from the TDM Highway time slot and sequences it into the reserved TDM Flow Queue 58 for the associated UTE Adapter. The Ethernet Switch Port Card then accesses its local address table using the associated TDM Flow Queue identifier to extract the UTE Adapter MAC SA. A standard Ethernet packet header is formed and attached to the received payload information, using the UTE Adapter MAC SA retrieved from the local address table as the MAC DA for the packet. The MAC Address of the MAC port on the Ethernet Switch Port Card servicing the LAN segment attached to the UTE Adapter is inserted as the MAC SA in the packet header. The packet is then transferred to the associated MAC port and transmitted over the Ethernet segment 34 to the UTE Adapter. The MAC adds the Cyclic Redundancy Check (CRC) at the end of the payload information to provide the Frame Check Sequence (FCS) required for a standard Ethernet packet The method and apparatus described above provides a means to translate the MAC address used by a traditional data communications system to a TDM Highway time slot address used by a traditional telecommunications system. In a complementary fashion, the method and apparatus provides a means to translate the TDM Highway time slot address used by a traditional telecommunications system to a MAC address used by a traditional data communications system. This address translation process enables a data communications network and a telecommunications network to exchange information on a connection-oriented base between the two networks. These are features of the present invention.

The UTE Adapter 46 receives the packet from the Ethernet Switch Port Card 54 and first reads the standard Ethernet header. It recognizes the MAC DA as its MAC address, indicating that the packet contains information requiring further processing. The UTE Adapter then uses the MAC SA from the standard Ethernet header to access its local address table. However, its local address table will not have this MAC Address entry because the UTE Adapter has just gone through a Power-Up-Reset sequence caused by its initial attachment to the LAN segment. The UTE Adapter examines packets that arrive at its network port that do not have an entry in the local address table more closely. The UTE Adapter reads further into these packets and looks for the CBR Processing CPU device type carried in a higher level protocol header. If the higher level protocol header and CBR Processing CPU device type are recognized, a local TDM Flow Queue is reserved for the CBR Processing CPU packet traffic. The local address table is then updated with the new MAC SA of the user port on the Ethernet Switch Port Card servicing the LAN segment and an identifier for its assigned TDM Flow Queue is added to the table entry. If after reading further into the packet, the UTE adapter does not recognize the higher level protocol header for carrying the CBR Processing CPU device type, the local address table is updated with the new MAC SA of the packet. The packet is then processed as a standard Ethernet data packet.

This establishes the simplex connection path from the CBR Processing CPU to the UTE Adapter, which completes the full-duplex Permanent Virtual Connection (PVC) for the logical signaling channel link between the UTE Adapter and the CBR Processing CPU in the common equipment. This is a feature of the present invention.

At this point in the initialization process, a full-duplex communications path has been established between the UTE Adapter and the CBR Processing CPU. Next the UTE Adapter makes a request to the CBR Processing CPU for the amount of CBR channel bandwidth it needs to support the Digital Key Telephone it is servicing. If the amount of requested CBR channel bandwidth is available on the LAN segment in question, the CBR Processing CPU notifies the Ethernet Segmentation and Re-assembly (SAR) function on the Ethernet Switch Port Card to size the reserved TDM Flow Queues for the requested CBR channel bandwidth. The CBR Processing CPU then notifies the UTE Adapter to initialize its Ethernet SAR function and to size its local TDM Flow Queues for the requested CBR channel bandwidth. The Ethernet Switch Port Card then starts the transmission of Master Ethernet Packets at a fixed rate to the UTE Adapter. It uses the MAC SA from the packet header of the initial signaling and control packets received from the UTE Adapter for the MAC DA in the Master Ethernet Packets it is transmitting to the UTE Adapter. If there is not enough CBR channel bandwidth available on the LAN segment to support the request from the new UTE Adapter attached to the LAN segment, the CBR Processing CPU will deny the request. The UTE Adapter is allowed to re-request the CBR channel bandwidth again at a later time, however, the re-request interval is set sufficiently long as to not clog the LAN segment with constant CBR channel bandwidth requests from a single UTE Adapter. In addition, the CBR Processing CPU will log the request and notify the UTE Adapter when the LAN segment has sufficient bandwidth to handle the request.

This is the last step in the initialization process, and at this point the Ethernet Switch Port Card and the UTE Adapter are ready to start exchanging Master Ethernet Packets.

The UTE Adapter initializes its Ethernet SAR function and starts sending Master Ethernet Packets at a fixed rate to the Ethernet Switch Port Card. The Ethernet SAR function uses the MAC SA from the packet header of the initial signaling and control packets received from the Ethernet Switch Port Card for the MAC DA in the Master Ethernet Packets it is transmitting to the Ethernet Switch Port Card. This is the MAC Address of the port on the Ethernet Switch Port Card servicing the LAN attached to the UTE Adapter.

The user port on the Ethernet Switch Port Card receives the Master Ethernet Packet from the UTE Adapter, reads the packet header, and recognizes the MAC DA as its MAC address, indicating that the packet contains information requiring further processing. The MAC SA carried in the header of the Master Ethernet Packet is used to search its local address table for a match. It will find a match at this point because the local address table of the Ethernet Switch Port Card was updated with the UTE Adapter's MAC SA when it processed the initial broadcast or multicast packet from the UTE Adapter. The entry that is returned from the local address table search will contain the identifier for the reserved TDM Flow Queue. It should be noted and understood that multiple independent CBR Channels with differing CBR channel bandwidths can be supported in the PVC over a LAN segment between a UTE Adapter and a user port on the Ethernet Switch Port Card. In this case, the entry that is returned from the local address table search will contain the pointer to a table of the reserved TDM Flow Queues. The Ethernet SAR function then uses these table entries to process the multiple CBR channels carried in the payload of the Master Ethernet Packets.

The Ethernet Switch Port Card and UTE Adapter are now operating in the Master Ethernet Packet mode with their Ethernet SAR functions enabled. In this mode of operation, signaling and control information is sent to the UTE Adapter from the CBR Processing CPU in the form of standard Ethernet packets encapsulated in the user data packet payload area of the Master Ethernet Packets. Likewise, any signaling or further CBR channel bandwidth requests are sent to the CBR Processing CPU from the UTE Adapter in the form of standard Ethernet packets encapsulated in the user data packet payload area of the Master Ethernet Packets. When an Ethernet SAR function extracts an encapsulated user data packet from the Master Ethernet Packets, it checks the MAC DA in the encapsulated packet header. If the MAC DA of the packet matches the MAC Address of the port being serviced by the Ethernet SAR function, the packet is processed as a signaling and control packet. If the extracted packet MAC DA does not match the MAC address of the port being serviced by the Ethernet SAR function, it is used to access the local address table to determine its intended destination.

The user port on the Ethernet Switch Port Card parses the standard Ethernet header from the received Master Ethernet Packet and places the payload information into the local packet buffer. The Ethernet SAR function extracts the CBR channel payload information and transfers it into the reserved TDM Flow Queue. The CBR channel information is then sequenced from the TDM Flow Queue and transmitted in a synchronous time slot on the TDM Highway to the CBR Processing CPU. The CBR Processing CPU receives the signaling information from the UTE Adapter attached to the LAN segment serviced by the associated user port on the Ethernet Switch Port Card, marks the device as being "In Service", and starts sending signaling information through the CBR channel to the UTE Adapter.

In this embodiment of the present invention, the CBR channel is used to provide the transfer of signaling information between a Digital Key Telephone 38 (through the UTE Adapter 46) and the CBR Processing CPU 52 in the CSM 44. These signaling transmissions provide the communications link that is required between the CBR Processing/Feature software executing on the CBR Processing CPU and the requests made by the user through the Dial Pad and Feature Keys on the Digital Key Telephone. A PVC is required for the signaling channel because it is necessary to exchange signaling information between the CBR Processing CPU and the Digital Key Telephone as long as the telephone is attached to the LAN segment. Now that the Digital Key Telephone has been brought into operation and is exchanging signaling information over the CBR channel with the CBR Processing CPU, a call set up request can be made. In response to a key closure, or hook switch transition on the Digital Key Telephone, a signaling message is sent to the CBR Processing CPU to establish a voice connection (i.e., audio channel). In response to the signaling message, the CBR Processing CPU informs the Ethernet Switch Port Card and the UTE Adapter to expand the size of their TDM Flow Queues to include the CBR channel bandwidth required for the voice connection. It is important to note here that the TDM Flow Queues previously reserved have established a PVC between the UTE Adapter and the CBR Processing CPU. This same PVC is used to route the voice information between the Digital Key Telephone serviced by the UTE Adapter attached to the LAN segment and the CBR Processing CPU. However, the bandwidth of the CBR channel, initially used to transport just the Digital Key Telephone signaling information, is extended to accommodate an additional 64 Kbps to transport the encoded PCM words of the voice signal.

The method and apparatus described above demonstrates the automatic reservation of a full-duplex TDM Flow Queue providing a PVC for the transfer of CBR channel information. This is a feature of the present invention. Another feature of the present invention is the ability to manage and dynamically modify the bandwidth of the TDM Flow Queues to supply the required amount of CBR channels and CBR channel bandwidth on the LAN segments serviced by the system. Using the same PVC, initially established to transport signaling information, for the transport of voice information, eliminates the necessity to create another logical connection over the LAN segment. This is yet another feature of the present invention.

Functional Description of the Communications Switching Module

Referring to FIG. 4, the Communications Switching Module (CSM) contains some number of user ports, in one possible embodiment eight (8) auto sensing 10/100 ports (i.e., 10Base-T/100Base-TX), which are used to provide the communications link between the CSM and the User Terminal Equipment (UTE) Adapters serving the user terminal equipment over isolated 10/100 Ethernet LAN segments. In addition, the CSM contains two (2) types of system interface ports: 1) a high-speed packet interface 62, in one possible embodiment a 1 Giga Bit per second (Gbps) LVDS (Low Voltage Differential Signaling) channel interface for transporting packets to other system modules; and 2) a Time Domain Multiplexed (TDM) Synchronous Full-Duplex Highway structure 64, in one possible embodiment framed at an 8 Khz (125 µs) rate and clocked at 4.096 Mbps providing sixty-four (64) synchronous 8 bit time slots per frame. Each Highway time slot is capable of transporting one (1) 8 bit byte per frame, and with a frame repetition rate of 8 Khz (125 µs), the Highway 64 is capable of carrying sixty-four (64) 64 Kbps TDM channels for transporting signaling, control, call set up and Constant Bit Rate (CBR) data to other system modules.

Constant Bit Rate (CBR) Circuit Switched Channel Emulation

The Communications Switching Module (CSM) performs conventional Ethernet switching functions, but also is enhanced to format and transmit special Master Ethernet Packets as a method to emulate the transmission of Constant Bit Rate (CBR) circuit switched channels over a LAN segment. The bandwidth of the CBR channel is scalable up to the data transport bandwidth of the LAN segment less the bandwidth required to support the Master Ethernet Packet overhead. The CBR channels are used to transport delay sensitive information (e.g., audio/video) between the user terminal equipment attached to a LAN segment and the CSM. In the CSM, the information carried within the emulated CBR channels over the LAN segment is extracted and transferred to a Time Domain Multiplexed (TDM) Highway structure common to all user and network interface cards, and processing cards. This common TDM Highway structure is used to transport the CBR channel information within the CSM.

In one possible embodiment of the invention, a LAN transport frequency of 10 Mhz (e.g., 10Base-T Ethernet) and a TDM Highway transport frequency of 4.096 Mhz are used. In this embodiment, it is desirable to provide a CBR channel bandwidth of 64 Khz to transport PCM encoded voice words over the LAN segment and into a DS0 (64 Kbps) channel time slot on the TDM Highway. Because the CBR channel data bits are transported over the LAN segment at a 10 Mbps rate, they must be converted to a 4.096 Mbps rate to be transported in a DS0 (64 Kbps) channel time slot over the TDM Highway. The DS0 channel can then be transported over the TDM Highway to the various user and network interface or processing cards. The rate conversion function for the TDM Highway structure is performed as the CBR channel data bits move through the TDM Flow Queue. Note that this transport rate conversion process does not affect the CBR channel bandwidth or the information rate carried within the CBR channel. Also note that the conversion between the transport rate of the LAN segment and the transport rate of the TDM Highway are only intermediate rate conversions which accommodate the transmission of the CBR channel data bits over the associated transport link. The source and destination points of the information carried in the CBR channel operate on the CBR channel information at the constant specified rate, in this embodiment 64 Kbps. Therefore, an initial rate conversion is necessary at the User Terminal Equipment (UTE) Adapter attached to the LAN segment to convert the CBR channel data bits to the 10 Mbps rate for transport over the LAN segment. The TDM Flow Queues in the CSM then convert the CBR channel data bits to the 4.096 Mbps rate of the TDM Highway. Another rate conversion is also required at the TDM Highway interface to a user, network or processing card in the CSM that is operating on the CBR channel data stream. Note that the transport rate of the destination interface card may not be the native 64 Kbps of the CBR channel chosen in this embodiment. For example, if the destination card in the CSM is a T1 line interface card, the S1 transport rate used by the T1 line is 1.544 Mbps. The DS1 is capable of transporting twenty-four (24) DS0 (64 Kbps) CBR channels. Therefore, the CBR channel data bits would be converted from the 4.096 Mbps transport rate of the TDM Highway to the 1.544 Mbps transport rate of the T1 line interface, allowing the CBR channel data bits to be transported over the T1 line in one (1) of the twenty-four (24) DS0 channels supported by the interface. Ultimately, at the far end of the network (i.e., the final termination point of the CBR channel), the CBR channel data bits are converted to their native rate (in this embodiment 64 Kbps) in order to be operated on by the destination terminal device.

A feature of the present invention is providing a method and apparatus to transport CBR channels over a LAN segment to produce a low latency path for delay sensitive information (e.g., audio/video), without significantly impacting the transmission rate of the packets carrying data over the LAN segment. Each Ethernet packet transported over the LAN segment requires eight (8) octets for the Preamble and Start of Frame Delimiter (SFD), a fourteen (14) octet Ethernet Header, a four (4) octet Frame Check Sequence (FCS) and a minimum of twelve (12) null octet times for the Inter Packet Gap (IPG). Therefore, each Ethernet packet transported over the LAN segment carries with it thirty-eight (38) octets of overhead, regardless of the number of data octets carried in the packet payload.

Proposals have been advanced in the past by a number of authors to fragment large data packets into small packets enabling priority packets carrying the delay sensitive information timely access to the media by inserting them between the small packet fragments. However, each small packet fragment, and each priority packet carrying the delay sensitive information, require thirty-eight (38) octets of overhead significantly reducing the transmission rate of the data carried over the LAN segment. The issue of providing a method to produce a low latency path for delay sensitive information over the LAN segment without significantly impacting the transmission rate of packets carrying data over the same LAN segment is addressed below.

Another feature of the present invention is the generation and transmission of Master Ethernet Packets at a constant 1 ms (Type I), or 125 $\mu$s (Type II), rate with CBR channel data bits encapsulated at fixed locations within the packets. This feature of the present invention provides a deterministic transmission scheme, which enables the receiver to synchronously extract the CBR channel data bits from the arriving packets. (Note that the term "receiver" used in this context refers to the Media Access Controller (MAC), Ethernet Segmentation and Re-assembly (SAR) function, and the Timing & Control Logic coupled to the TDM Flow Queues.)

In one possible embodiment of the present invention, based on 10Base-T Master Ethernet Packets 1 ms in length (Type I), the CBR channel data bits are distributed at fixed 250 $\mu$s intervals in the packet flow. This enables a Master Ethernet Packet 1 ms in length to carry four (4) groups of CBR channel data bits spaced at fixed 250 $\mu$s intervals. The remaining payload bits in the Master Ethernet Packet are available to carry encapsulated user data packets. The placement of the CBR channel data bits at fixed 250 $\mu$s intervals in the packet flow has been chosen to provide a low latency path for the CBR channel information while maintaining a high efficiency for the data transport over the LAN segment. Encapsulating CBR channel data and user packet data into Master Ethernet Packets significantly reduces the number of overhead octets required compared to the packet fragmentation method. The Master Ethernet Packet requires the same overhead as any standard Ethernet packet: thirty-eight (38) octets. The CBR channel requires no overhead octets because the receiver is capable of extracting the CBR channel data bits from the fixed locations within the Master Ethernet Packet. The user data packets are segmented and encapsulated within the Master Ethernet Packet in the payload areas between the four (4) groups of fixed CBR channel locations. A maximum sequence of five (5) overhead octets is required in a Master Ethernet Packet carrying the last segment of one encapsulated user data packet and the first segment of the next encapsulated user data packet. The receiver uses this sequence of five (5) octets to determine where an encapsulated user data packet ends and where the next encapsulated user data packet header starts. The standard overhead for the Master Ethernet Packet is thirty-eight (38) octets plus a maximum of five (5) octets used to locate the start of an encapsulated user data packet within the payload of a Master Ethernet Packet, yielding a total maximum overhead of forty-three (43) octets. The overhead for the transmission of four (4) priority minimum size Ethernet packets carrying delay sensitive information and four (4) Ethernet packets carrying the user data packet fragments is three-hundred-four (304) octets. This does not account for any proprietary header requirements of the user data packet fragments or unused payload octets in the minimum size Ethernet packet payload (46 octets) carrying the delay sensitive information.

In another possible embodiment of the present invention, using 100Base-TX Master Ethernet Packets 125 $\mu$s in length (Type II), the CBR channel data bits are distributed at fixed 125 $\mu$s intervals in the packet flow. This enables a Master Ethernet Packet 125 $\mu$s in length to carry one (1) group of CBR channel data bits spaced at fixed 125 $\mu$s intervals from one Master Ethernet Packet to the next. The remaining payload bits in the Master Ethernet Packets are available to carry encapsulated user data packets. The transport of the CBR channel data bits over the LAN segment at 100 Mbps and the associated rate conversions required to carry the CBR information through the system is implemented in a manner similar to that previously described for the Type I frame.

Ethernet Segmentation and Re-assembly (SAR) Function

The Constant Bit Rate (CBR) channels and user data packets are segmented and encapsulated into the Master Ethernet Packets transmitted, extracted from the received Master Ethernet Packets and reassembled by the Ethernet Segmentation and Re-assembly (SAR) function. These are features of the present invention.

The Ethernet SAR function is implemented at each user port of the Communications Switching Module (CSM), as well as at the network port of the User Terminal Equipment (UTE) Adapter. The "segmentation" section of the Ethernet SAR function segments and encapsulates the CBR channel information into fixed locations within the Master Ethernet Packet payload. In addition, the "segmentation" section of the Ethernet SAR function segments and encapsulates the user data packets into the payload areas not occupied by the fixed CBR channel locations. The Master Ethernet Packet is then passed to the Media Access Controller (MAC) for transmission over the LAN segment. The "re-assembly" section of the Ethernet SAR function extracts the encapsulated CBR channel information and user data packets from the received Master Ethernet Packets and reassembles them into their original form.

Due to the asynchronous nature of the user data packets, a single Master Ethernet Packet must be capable of carrying the last segment of one encapsulated user data packet and the first segment of the next encapsulated user data packet. In addition, the "re-assembly" section of the Ethernet SAR function needs a means of detecting the start, and end, octet of the encapsulated user data packet. A maximum sequence of five (5) overhead octets provides a method to detect the start, and length of the encapsulated user data packet. A predefined sequence of "Idle" and "Sync" overhead octets are used to detect the start of a user data packet encapsulated into the payload of a Master Ethernet Packet. This sequence of overhead octets consists of one (1) or two (2) "Idle" octets followed by a "Sync" octet and a two (2) octet "User Data Packet Length" descriptor. When there is no user data packet flow over the LAN segment, the payload areas not occupied by the fixed CBR channel locations in the Master Ethernet Packet are filled with "Idle" characters. A user data packet transmission can be initiated at any time because of the asynchronous nature of the user terminal equipment attached to the LAN segment. The Ethernet SAR function monitors the payload area of the received Master Ethernet Packet and when it detects a change in the user data packet octets from the "Idle" characters to a "Sync" character, it knows that the reception of an encapsulated user data packet has started. The detection criteria for the start of an encapsulated user data packet are a minimum of one (1) "Idle" character immediately followed by one (1) "Sync" character. By definition, the two (2) byte "User Data Packet Length" descriptor immediately follows the "Sync" character. The User Data Packet Length descriptor informs the Ethernet SAR function of the number of bytes in the encapsulated user data packet, including the packet Header and Frame Check Sequence (FCS). The Header of the encapsulated user data packet immediately follows the User Data Packet Length descriptor.

The Ethernet SAR function extracts the encapsulated user data packet from the received Master Ethernet Packet payload in the following manner. First, the Ethernet SAR function searches for the start of a user data packet encapsulated in the Master Ethernet Packet payload by monitoring the payload octets for the start of a user data packet character sequence. This sequence must contain at least one (1) "Idle" character immediately followed by one (1) "Sync" character. Second, the Ethernet SAR function reads the two (2) byte User Data Packet Length descriptor immediately following the "Sync" Character. Third, the Ethernet SAR function uses the number carried in the User Data Packet Length descriptor field to count the number of bytes to be extracted (i.e., the number of bytes contained in the user data packet) from the Master Ethernet Packet. Fourth, the Ethernet SAR function reads the bytes carried in the octets immediately following the last byte of the encapsulated user data packet. These octets must be carrying a minimum of one (1) "Idle" character immediately followed by one (1) "Sync" character (i.e., the start of user data packet character sequence, indicating that another user data packet is to follow) or multiple "Idle" characters (i.e., the payload octets have been filled with "Idle" characters, an indication that the user data packet transmissions have stopped). When either of these character sequences are found, the Ethernet SAR function will check the FCS value carried in the last four (4) octets of the extracted user data packet against the value it calculates from the data carried in the extracted user data packet. If the values match, the Ethernet SAR function directs the reassembled packet to a User Packet Flow Queue for forwarding. If the values do not match, the Ethernet SAR function will discard the extracted user data packet and continue to search the user data packet payload area of the Master Ethernet Packet for a valid start of user data packet character sequence (i.e., at least one (1) "Idle" character immediately followed by one (1) "Sync" character). Should any other character sequence carried in the octets immediately following the end of an encapsulated user data packet be detected, it is an indication that the Ethernet SAR function is out of synchronization with the encapsulated user data packet frame. In this case, the Ethernet SAR function will discard the extracted user data packet and continue to search the user data packet payload area of the Master Ethernet Packet for a valid start of user data packet character sequence.

The preceding description has shown that the Ethernet SAR function must attain synchronization with the boundaries of the user data packets encapsulated in the Master Ethernet Packets. A means to provide the synchronization of the Ethernet SAR function to the boundaries of the encapsulated user data packets has been provided by adding the "Idle", "Sync" and "User Data Packet Length" descriptor overhead octets to the beginning of the user data packet. However, it is possible for the defined sequence of "Idle" and "Sync" octets to be encountered within the user data packet boundaries causing a false start of user data packet indication. Therefore, just detecting a sequence of "Idle" and "Sync" octets alone is not sufficient to define the start of an encapsulated user data packet. The addition of the User Data Packet Length descriptor and a Cyclic Redundancy Check (CRC) of the encapsulated user data packet completes the process. Synchronization is straightforward when no user data packets are flowing over the link and the Ethernet SAR function has been monitoring a steady stream of "Idle" characters. As soon as a "Sync" character comes along, the Ethernet SAR function reacts to the character sequence as a start of user data packet indication. In this example the start of user data packet indication is most likely correct. However, take for example an Ethernet SAR function that is initialized and brought online only to find out that there are user data packets already flowing when it starts to monitor the Master Ethernet Packet payload. In this example, the Ethernet SAR function must go through the following synchronization sequence. First, it looks for a minimum of one (1) "Idle" character followed by a "Sync" character. It then reads the two (2) octets immediately following the "Sync" character assuming this is the User Data Packet Length descriptor field. It uses the value in the assumed User Data Packet Length descriptor field to count the number of octets in the encapsulated user data packet to be extracted. It extracts the user data packet, and then reads the two (2) octets immediately following the last extracted octet of the encapsulated user data packet. The characters carried in these two (2) octets must be the "Idle" and "Sync" characters respectively, or two (2) "Idle" characters. If they are not, the Ethernet SAR function continues to monitor the user data packet payload area of the Master Ethernet Packet for an "Idle" character followed by a "Sync" character and starts the assumption process again. Through this iterative assumption process, the Ethernet SAR function will correctly align to the start of an encapsulated user data packet. To verify that it has achieved alignment with the encapsulated user data packet, the Ethernet SAR function reads the two (2) octets immediately following the last extracted octet of the encapsulated user data packet and finds the "Idle" character followed by a "Sync" character, or two (2) "Idle" characters. As a final check, it compares the FCS carried in the encapsulated user data packet against the CRC it calculated for the user data packet. A match is the final verification that the Ethernet SAR function is in synchronization with the encapsulated user data packets.

In one possible embodiment of the present invention, the "Idle" octet has been defined to carry the "7E" hexadecimal character and the "Sync" octet has been defined to carry the "4D" hexadecimal character. However, it should be noted that other "Idle" and "Sync" characters could be chosen to implement a sequence of octets that the Ethernet SAR function could use to locate the start of an encapsulated user data packet within the payload of a Master Ethernet Packet.

The preceding description has explained the operation of the Ethernet SAR function on the received Master Ethernet Packets, i.e., the extraction and ref assembly mode. The following description pertains to the operation of the Ethernet SAR function on the transmitted Master Ethernet Packets, i.e., the segmentation and encapsulation mode.

The Ethernet SAR function operates on user data packets in a store and forward mode. An entire user data packet is presented to the Ethernet SAR function for encapsulation processing into a Master Ethernet Packet. Upon the asynchronous arrival of the user data packet, the Ethernet SAR function first determines the number of empty octets in the user data packet payload area of the Master Ethernet Packet being processed. The Ethernet SAR function then adds the overhead octets for the start of user data packet sequence (i.e., at least one (1) "Idle" character immediately followed by one (1) "Sync" character) and the "User Data Packet Length" descriptor to the user data packet. Next, the Ethernet SAR function determines the length of the user data packet, including the Header, FCS and added overhead octets. Then, using the number of empty octets in the user data packet payload area of the Master Ethernet Packet being processed as a limit, the Ethernet SAR function starts the transfer of the user data packet octets, including the Header, FCS and added overhead octets, to the Master Ethernet Packet. As the octets are transferred into the Master Ethernet Packet payload, the Ethernet SAR function decrements the count of empty octets in the user data packet payload area of the Master Ethernet Packet. This process of transferring user data packet octets into the Master Ethernet Packet continues until the entire user data packet has been transferred into the Master Ethernet Packet payload, or until there are no empty octets left in the Master Ethernet Packet payload. In either case, the Ethernet SAR function has a number of process steps to execute. When the entire user data packet has been transferred and there are still empty octets remaining in the Master Ethernet Packet payload, the Ethernet SAR function checks the User Packet Flow Queue to see if there is another user data packet waiting to be encapsulated. However, if there are no further user data packets waiting to be encapsulated, the Ethernet SAR function fills the remaining user data packet payload area of the Master Ethernet Packet with "Idle" characters. This is an indication to the Ethernet SAR function at the other end of the link that the flow of user data packets has stopped. If there is another user data packet waiting to be encapsulated, the Ethernet SAR function adds the overhead octets for the start of user data packet sequence and the "User Data Packet Length" descriptor to the waiting user data packet and reinstates the transfer sequence described above. In the case where there are no empty octets left in the Master Ethernet Packet payload and the entire user data packet has not been transferred, the Ethernet SAR function halts the transfer until the next Master Ethernet Packet is available. It then continues the transfer of the user data packet octets into the next Master Ethernet Packet payload. The transfer process continues until the remaining user data packet octets have been transferred into the next Master Ethernet Packet payload.

In one possible embodiment of the present invention, the user data packets are standard Ethernet packets. The maximum standard Ethernet packet size is 1518 octets and can be accommodated by the available user data packet payload area within two (2) Master Ethernet Packets. Therefore, no more than two (2) Master Ethernet Packets would ever be required to transport any standard Ethernet user data packet. However, it should be understood, and can be seen from the description above, that the operation of the Ethernet SAR function is not limited to two (2) consecutive Master Ethernet Packets. User data packets much larger than a maximum size standard Ethernet packet can be encapsulated into a contiguous series of Master Ethernet Packets by the Ethernet SAR function for transmission over the LAN segment.

Figure 5:
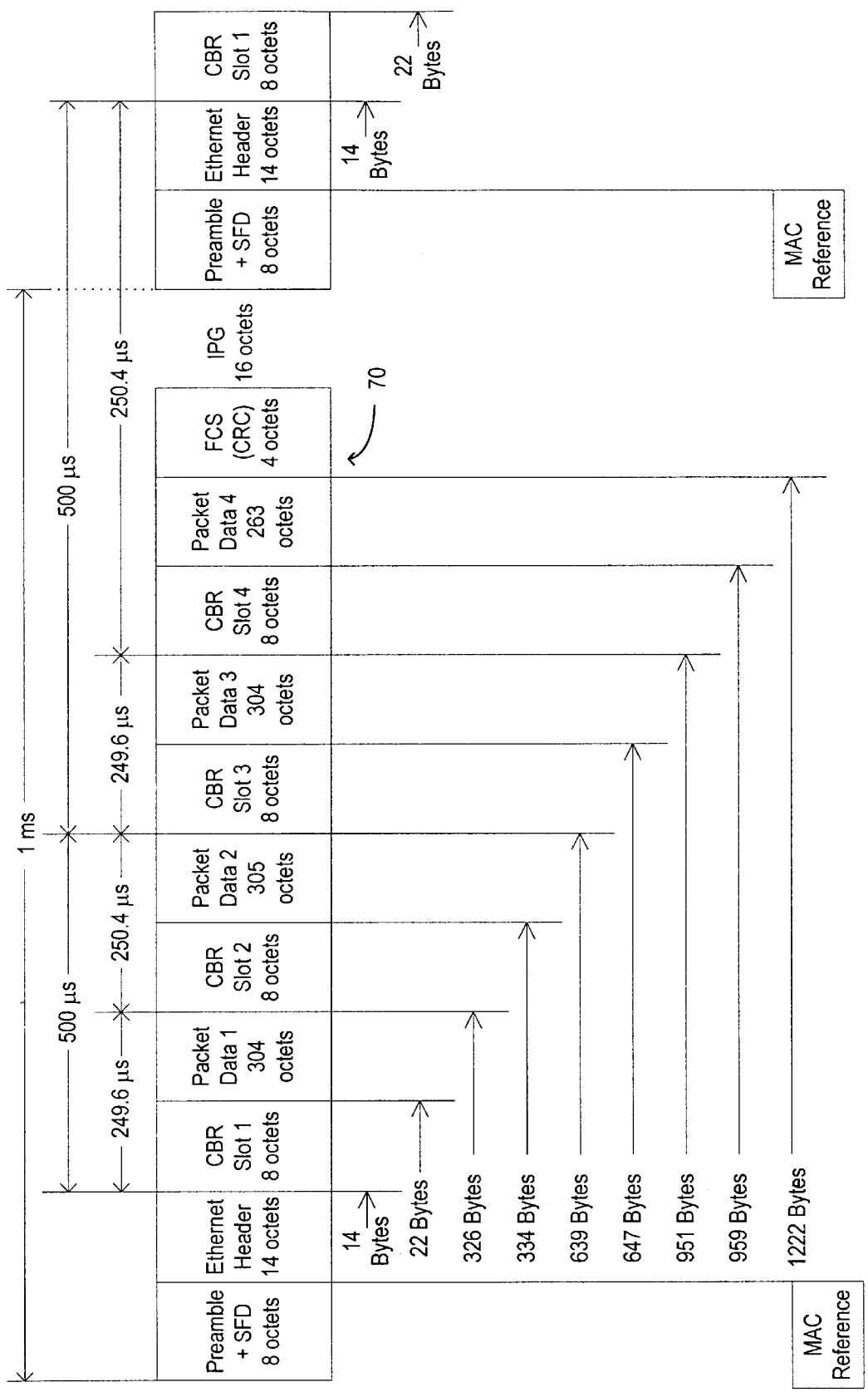
FIG. 5 is a packet block diagram, which illustrates the timing relationship between the Constant Bit Rate (CBR) Channel carrying octets of the Type I Master Ethernet Packet for 10Base-T, and references the start locations of the CBR channel and data carrying octet blocks within the frame.
Figure 6:
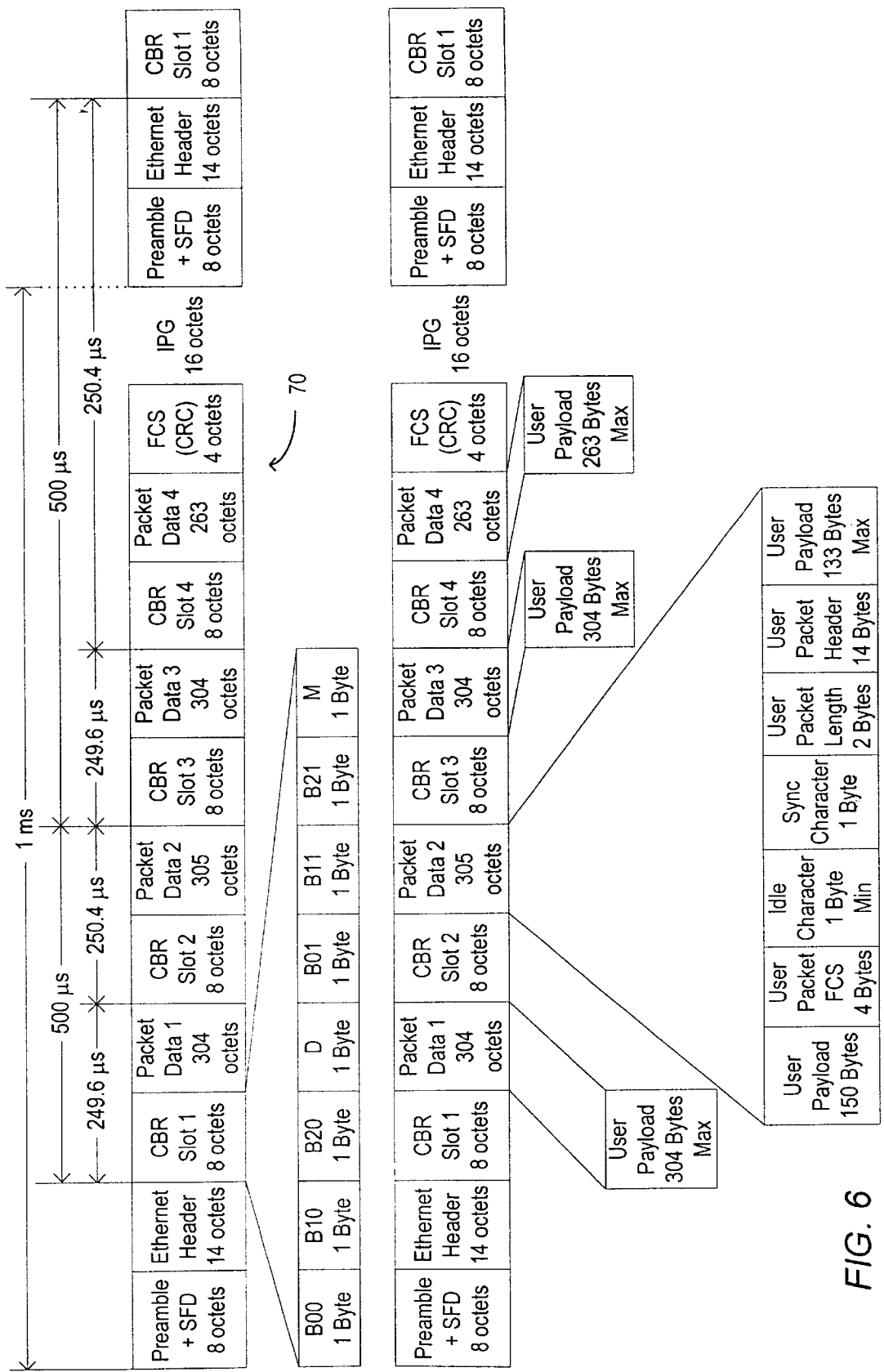
FIG. 6 is a packet block diagram, which illustrates the format of the information carried within the reserved Constant Bit Rate (CBR) channel blocks of octets, and an example of user data packet encapsulation in the Type I Master Ethernet Packet for 10Base-T.
Figure 7:
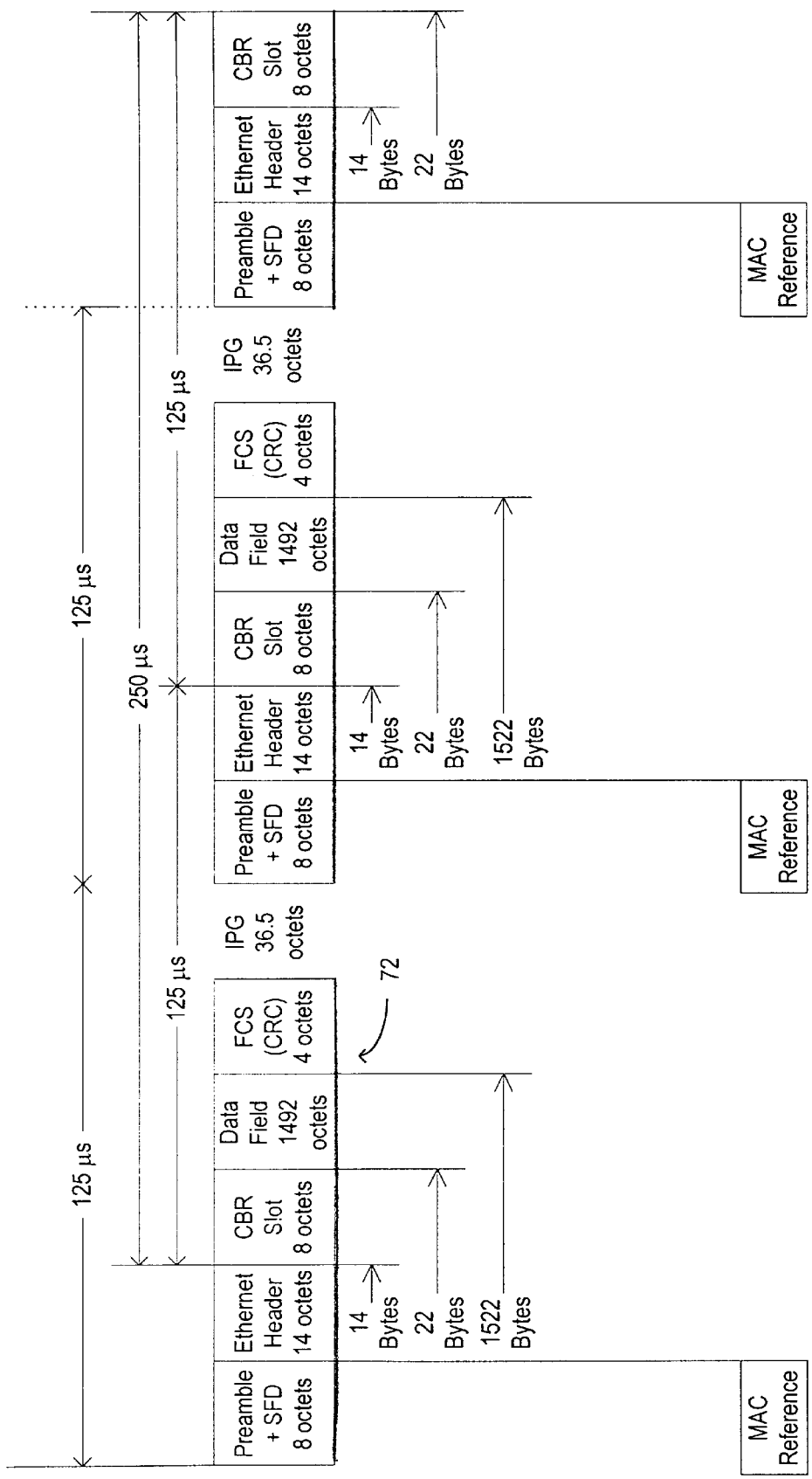
FIG. 7 is a packet block diagram, which illustrates the timing relationship between the Constant Bit Rate (CBR) Channel carrying octets of the Type II Master Ethernet Packet for 100Base-TX, and references the start locations of the CBR channel and data carrying octet blocks within the frame.
Figure 8:
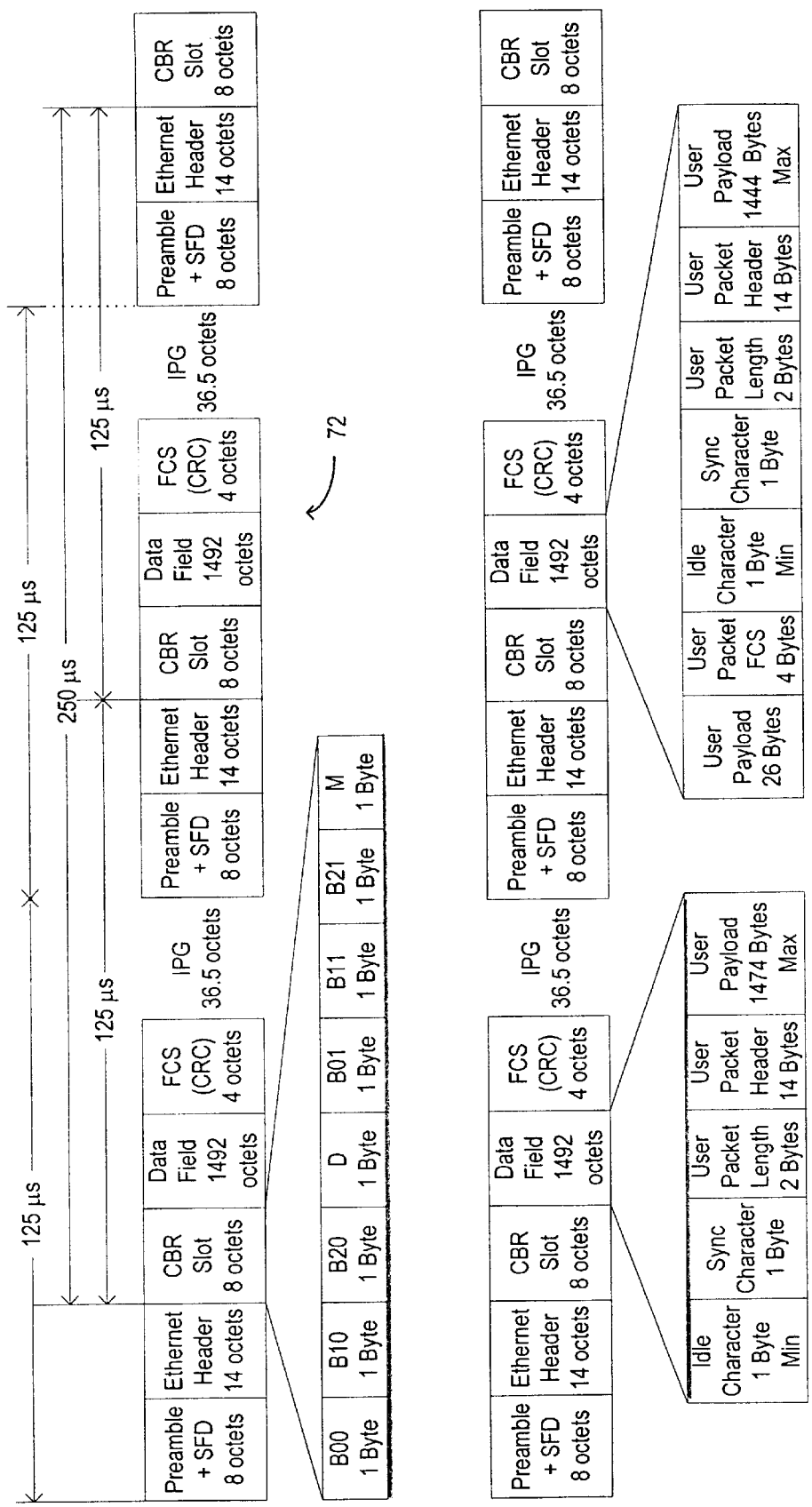
FIG. 8 is a packet block diagram, which illustrates the format of the information carried within the reserved Constant Bit Rate (CBR) channel block of octets, and an example of user data packet encapsulation in the Type II Master Ethernet Packet for 100Base-TX.
Figure 9:
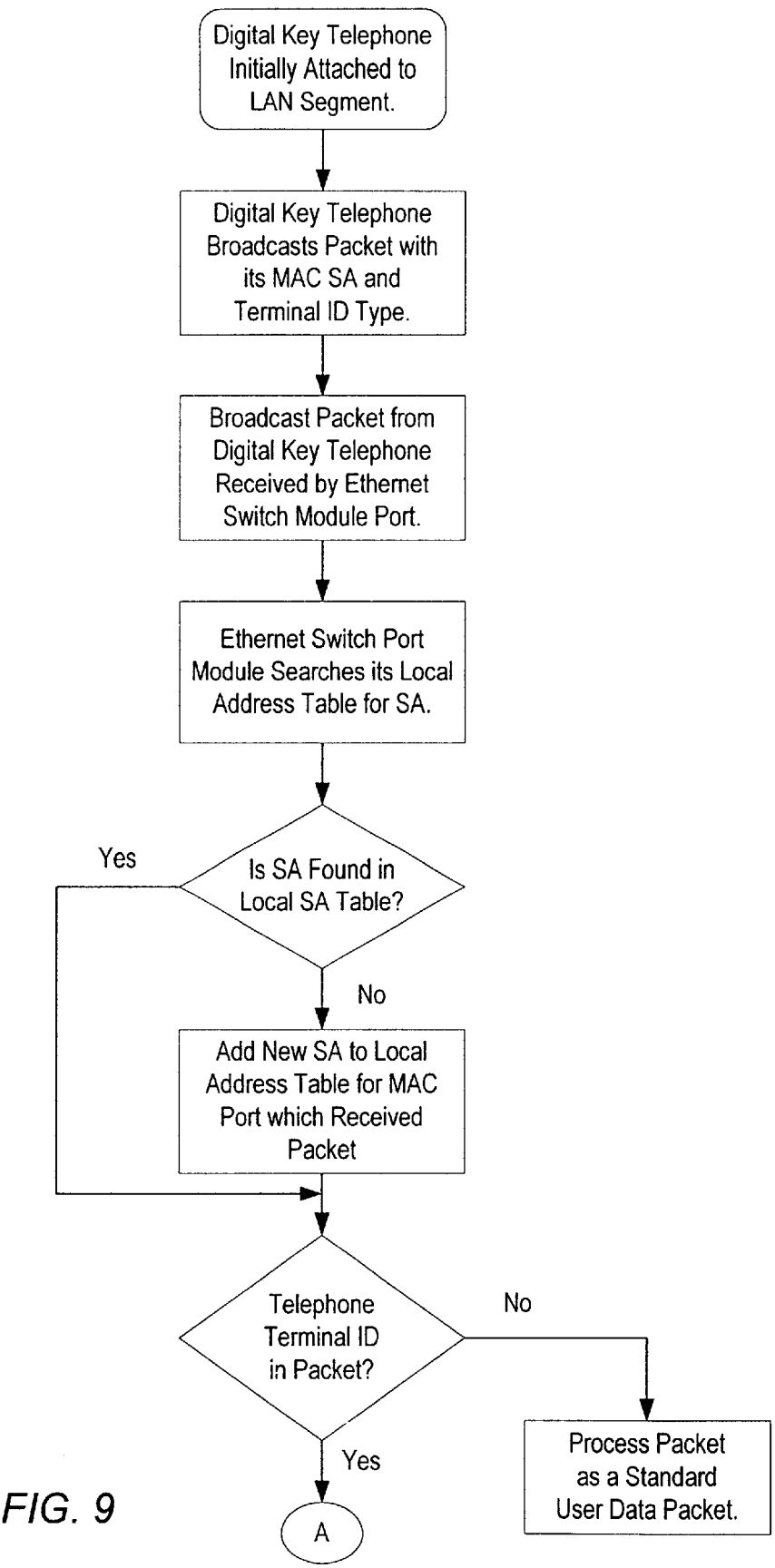
FIGS. 9, 10 and 11 are first, second and third pages respectively of a flow chart illustrating the automatic setup of a Permanent Virtual Connection (PVC) between user terminal, equipment and the Communications Switching Module (CSM).
Figure 10:
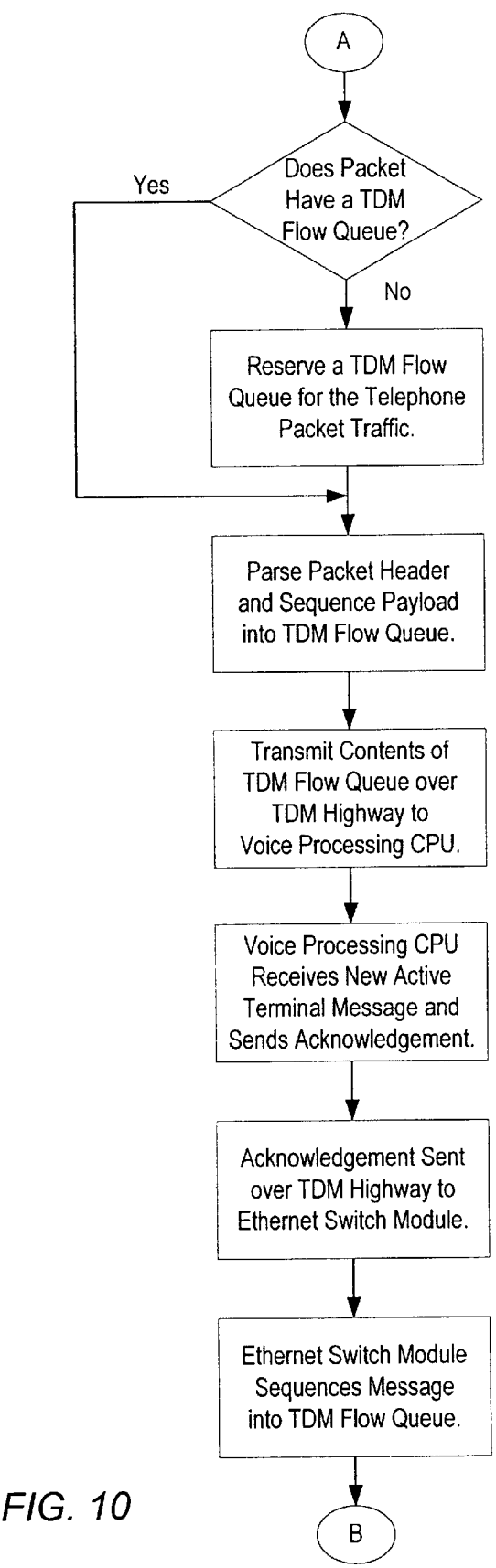
Figure 11:
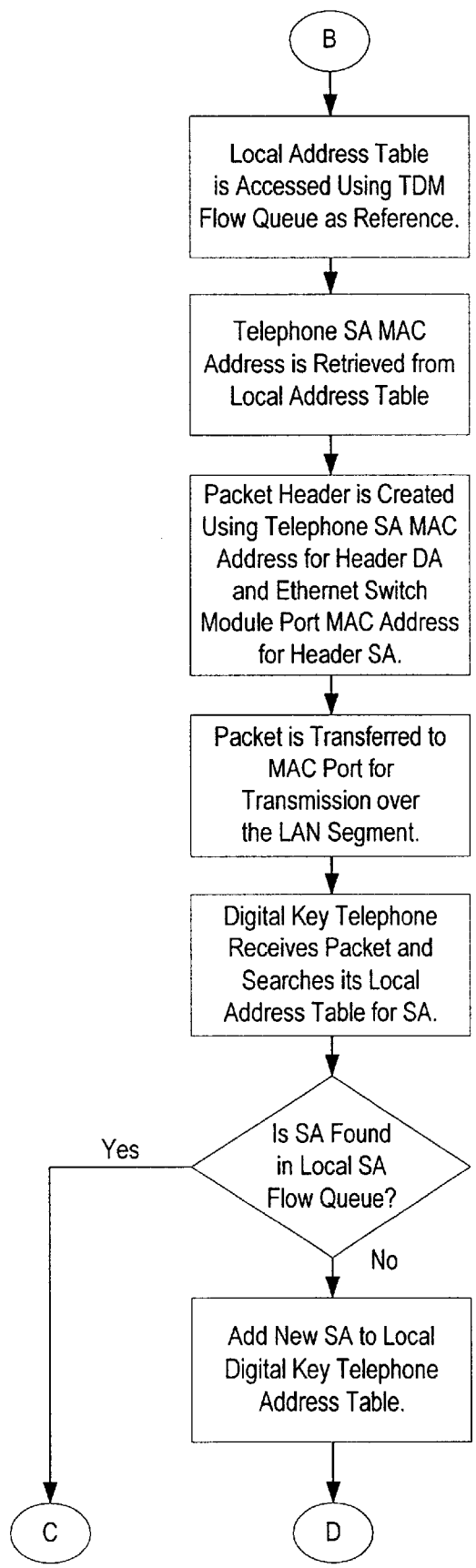

There are two (2) Master Ethernet Packet formats: 1) Type I for the 10Base-T Ethernet mode illustrated in FIGS. 5 and 6 at 70; and 2) Type II for the 100Base-TX Ethernet mode illustrated in FIGS. 7 and 8 at 72. The Ethernet SAR function operates on both Type I and Type II Master Ethernet Packets. The Ethernet SAR function receives the CBR channel data bits in a synchronous manner from a TDM Flow Queue and encapsulates them into fixed locations within the Master Ethernet Packet for transmission over the LAN segment as shown in FIGS. 5 and 7. When operating on received Master Ethernet Packets, the Ethernet SAR function extracts the CBR channel bits from the known fixed CBR channel locations within the Master Ethernet Packet payload and transfers them to a TDM Flow Queue in a synchronous manner. The section entitled "Operation of the Time Domain Multiplexed (TDM) Flow Queue" describes the synchronous operation of the TDM Flow Queues.

Format of the Master Ethernet Packets

As noted above, there are two (2) Master Ethernet Packet formats: 1) Type I for the 10Base-T Ethernet mode illustrated in FIGS. 5 and 6 at 70; and 2) Type II for the 100Base-TX Ethernet mode illustrated in FIGS. 7 and 8 at 72.

The Type I Master Ethernet Packet for 10 Mbps segments (10 Base-T) are generated at a constant 1 ms rate to facilitate Constant Bit Rate (CBR) transmission over the LAN segment between the Communications Switching Module (CSM) and the User Terminal Equipment (UTE) adapter. The 1 ms frame timing is measured from the start of the first Preamble Bit of one packet to the start of the first Preamble Bit of the next packet as shown in FIG. 5. Note that a fixed Inter Packet Gap (IPG) of sixteen (16) octet times is included in the 1 ms period.

In one possible embodiment of the present invention, four (4) blocks of eight (8) octets each are reserved within the frame to carry PCM encoded voice samples, Digital Key Telephone signaling information and management channel information. These blocks of reserved octets are used to transport three (3) 64 Kbps CBR B Channels, one (1) 32 Kbps CBR D Channel and one (1) 32 Kbps CBR Management Channel between the CSM and the UTE adapter.

The first reserved block of eight (8) octets starts immediately following the standard fourteen (14) octet Ethernet header and the remaining three (3) blocks start 326, 639 and 951 octets into the frame respectively, as shown in FIG. 5. The spacing of these reserved blocks within the frame has been designed to accommodate the standard sampling rate of 8 Khz (125 $\mu$s) used in digital telecommunications systems. Traditional Digital Line Transceivers used to link Digital Key Telephones to their common equipment transport two (2) PCM voice samples per B Channel between the Digital Key Telephone and the common equipment every 250 $\mu$s. However, using 10Base-T Ethernet as a transport medium, with an octet rate of 800 ns, causes the 250 $\mu$s PCM sample alignment to fall halfway through an 800 ns octet time. For this reason, the blocks of the reserved octets are alternately aligned on 800 ns octet boundaries at 249.6 $\mu$s and 250.4 $\mu$s producing a precise timing of 500 $\mu$s between every two (2) blocks of reserved octets, as shown in FIG. 5. The resulting transfer rate of PCM samples over the Ethernet LAN segment is 125 $\mu$s (i.e., two (2) samples every 250 $\mu$s).

The payload octets between the four (4) reserved blocks of eight (8) octets are available for the transport of user data packets. The octets available for the transport of user data packets are divided into four (4) blocks of 304, 305, 304 and 263 octets respectively, as shown in FIG. 5. Large user data packets must be segmented into these payload areas for transport over the LAN segment. To accommodate the re-assembly of the segmented user data packets, a proprietary header (i.e., a start of user data packet character sequence) is added to each encapsulated user data packet, an example of which is shown in FIG. 6. This proprietary header contains a minimum of one (1) "Idle" character, one (1) "Sync" character and a two (2) byte User Data Packet Length descriptor.

Referring now to FIGS. 7 and 8, the Type II Master Ethernet Packets for 100 Mbps segments (100Base-TX) are generated at a constant 125 µs rate to facilitate Constant Bit Rate (CBR) transmission over the LAN segment between the CSM and the UTE Adapter. The 125 µs frame timing is measured from the start of the first Preamble Bit of one packet to the start of the first Preamble Bit of the next packet as shown in FIG. 7. Note that a fixed IPG of 36.5 octets is included in the 125 µs period.

In one possible embodiment of the invention, one (1) block of eight (8) octets each is reserved within the frame to carry PCM encoded voice samples, Digital Key Telephone signaling information and management channel information. The block of reserved octets is used to transport three (3) 64 Kbps CBR B Channels, one (1) 32 Kbps CBR D Channel and one (1) 32 Kbps CBR Management Channel between the CSM and the UTE adapter.

The reserved block of eight (8) octets starts immediately following the standard fourteen (14) octet Ethernet header, as shown in FIG. 7. The spacing between the reserved block in one master packet to the next has been designed to accommodate the standard sampling rate of 8 Khz (125 µs) used in digital telecommunications systems. The locations of the reserved blocks of eight (8) octets, placed at 125 µs intervals from one packet to the next packet, take into account the Ethernet IPG requirement.

The reserved block of 1492 octets immediately following the reserved voice block is used to carry encapsulated user data packets. A maximum size user data packet will not fit into this reserved block of 1492 octets and will have to be segmented into multiple Type II frames. To accommodate the re-assembly of the segmented user data packets, a proprietary header is added to each encapsulated user data packet in a manner similar to that previously described for the Type I frame. The details of CBR and data blocks are shown in FIG. 8.

Synchronous Master Ethernet Frame Operation

The Communications Switching Module (CSM) 44 also contains the Ethernet Segmentation and Re-assembly (SAR) mechanism for formatting and transmitting data in Ethernet packets providing a synchronous low delay path over a single network link between the User Terminal Equipment (UTE) Adapter and the CSM. It is the Ethernet SAR mechanism that ensures a Quality of Service (QoS) for delay sensitive information.

To facilitate the transmission of Constant Bit Rate (CBR) channel information over the LAN segment, the timing signals (i.e., the clocks) in the UTE adapter and the CSM must be synchronized. The transmission of either Type I or Type II Master Ethernet Packets at a fixed constant rate from the CSM provides a timing reference for the UTE Adapter. This timing reference is used by the UTE adapter to lock its locally generated clocks to the master reference clock in the CSM. It is not necessary for the Master Ethernet Packets of each user port to be aligned with each other, but it is necessary that the individual Master Ethernet Packets have a synchronized access to the Time Domain Multiplexed (TDM) Flow Queues. The section entitled "System Timing Synchronization" describes the method by which the synchronization function for the UTE Adapter is performed in further detail.

In one possible embodiment of the invention for 10 Mbps Ethernet (10Base-T), the Ethernet SAR mechanism contained within the CSM creates the Master Ethernet Packets described in FIGS. 5 and 6 at a constant 1 ms rate for user ports on the CSM. In another possible embodiment of the invention for 100 Mbps Ethernet (100Base-TX), the Ethernet SAR mechanism contained within the CSM creates the Master Ethernet Packets described in FIGS. 7 and 8 at a constant 125 µs rate for user ports on the CSM.

These Master Ethernet Packets are used to encapsulate and transport both delay sensitive and non-delay sensitive data over the network link between any UTE Adapter and the CSM. This is performed by the Ethernet SAR function indicated by block 66 in FIG. 3 and the CSM indicated by 44 in FIG. 2 to accomplish the user data packet segmentation and encapsulation function and the complementary user data packet extraction and re-assembly function. The method and apparatus by which these functions are performed is explained in further detail under the section entitled "Ethernet Segmentation and Re-assembly (SAR) Function".

The segmentation portion of the Ethernet SAR function within the CSM combines both delay sensitive (e.g., audio/video) and non-delay sensitive (e.g., packet) data into Master Ethernet Packets for transmission to the UTE Adapter attached to the LAN segment serviced by the associated user port of the CSM. Conversely, the re-assembly portion of the Ethernet SAR function extracts and separates the delay sensitive (e.g., audio/video) and non-delay sensitive (e.g., packet) data received in Master Ethernet Packets from the UTE Adapter attached to the LAN segment serviced by the associated user port of the CSM.

The Ethernet SAR function provides the interfaces between the TDM Flow Queues, the User Packet Flow Queues, and the MAC (Media Access Controller) port interfaces of the CSM.

The preceding description has explained the operation of the synchronous Master Ethernet Packet from the viewpoint of a user port on the CSM. The operation of the Master Ethernet Packet at the network port of the UTE Adapter functions in a similar but complementary manner. The re-assembly section of the Ethernet SAR function in the UTE Adapter operates on the Master Ethernet Packets created by the segmentation section of the Ethernet SAR function in the CSM, and vice versa.

The Time Domain Multiplexed (TDM) Flow Queues

The Time Domain Multiplexed (TDM) Flow Queues 58 of the Communications Switching Module (CSM) are structured in accordance with the TDM Full-Duplex Highway structure used to transport Constant Bit Rate (CBR) channel information between the user, or network, interface cards and the CBR Processing Module of the CBR Processing CPU. The placement of the data bits carrying the CBR channel information within the Master Ethernet Packets has been designed to accommodate the standard sampling rate of 8 Khz (125 µs) used in digital telecommunications systems.

The TDM Flow Queues are groups of register bits or memory locations that are used to provide intermediate storage and conversion between Packet and TDM channel formats for the CBR channel data bits. Conversely, the TDM Flow Queues provide the conversion between TDM channel and Packet formats for the CBR channel data bits. The length (i.e., the number of bit positions) of a TDM Flow Queue is a function of the bandwidth of the associated CBR channel being serviced. Therefore, by changing the number of bit positions in the TDM Flow Queue, the bandwidth of the CBR channel serviced by the TDM Flow Queue can be scaled. In addition, multiple TDM Flow Queues of various lengths can be established providing service for multiple CBR channels of different bandwidths. These are features of the present invention.

The TDM Flow Queues are unidirectional and two (2) are required in order to provide a Full-Duplex flow of information. One (1) TDM Flow Queue is used to receive the CBR channel data bits from the Master Ethernet Packets and transmit them in a synchronous time slot on a TDM Highway. Conversely, one (1) TDM Flow Queue is required to receive the CBR channel data bits from a synchronous time slot on the TDM Highway and transmit them in the Master Ethernet Packets.

In one possible embodiment of the present invention, a TDM Highway consisting of sixty-four (64) 64 Kbps CBR channels is used for the transport of signaling, control, call set up and digitized voice (PCM) information between the Ethernet switching section and the CBR Processing Module section of the CSM. The sixty-four (64) Constant Bit Rate channels, or Time Slots, are segmented into three (3) channel types: 1) "PCM Channels" for carrying digitized voice information; 2) "Signaling Channels" for carrying Digital Key Telephone signaling, control and call setup information collectively in this channel type; and 3) a "Management Channel" for providing a communications link between the CBR Processing CPU and the Ethernet switching section. In this embodiment of the invention, thirty-two (32) of the sixty-four (64) time slots have been defined as "PCM Channels" providing the capacity for supporting thirty-two (32) simultaneous voice conversations on the TDM Highway. The PCM Channels consume 2.048 Mbps of the available 4.096 Mbps TDM Highway bandwidth. The remaining 2.048 Mbps of TDM Highway bandwidth is assigned to thirty-two (32) 32 Kbps Signaling Channels and one (1) 1.024 Mbps Management Channel. Note that the bit rates of all of the channel types are multiples, or sub-multiples, of the 64 Kbps TDM Highway time slots.

Operation of the Time Domain Multiplexed (TDM) Flow Queue

The Time Domain Multiplexed (TDM) Flow Queues provide the function of converting the Constant Bit Rate (CBR) channel data bits between TDM channel and Packet formats. In addition, the TDM Flow Queues provide the mechanism to synchronize and rate convert the CBR channel data bits between the IAN transport frequency and the transport frequency of the TDM Highway. These are features of the present invention.

The TDM Flow Queues are implemented as groups of storage elements (e.g., register bits or memory locations) that provide intermediate storage of the CBR channel data bits. The TDM Flow Queues are coupled to Timing & Control Logic that provides the synchronous conversion between Packet and TDM channel formats for the CBR channel data bits. The CBR channel data bits are extracted from the Master Ethernet Packets by the Ethernet Segmentation and Re-assembly (SAR) function and written into the storage elements of the TDM Flow Queue by the Timing & Control Logic. The CBR channel data bits are read from the storage elements of the TDM Flow Queue and sequenced into a time slot, or group of time slots, on the TDM Highway by the TDM Highway Interface Logic. Conversely, the CBR channel data bits are sequenced from the TDM Highway time slot, or group of time slots, by the TDM Highway Interface Logic and written into the storage elements of the TDM Flow Queue. The CBR channel data bits are read from the storage elements of the TDM Flow Queue by the Timing & Control Logic and encapsulated into the Master Ethernet Packets by the Ethernet SAR function.

The TDM Flow Queues are structured in accordance with the full-duplex TDM Highway structure used to transport the CBR channel information between the user, or network, interface cards and the CBR Processing Module of the CBR Processing CPU card. In one possible embodiment of the present invention, the repetitive frame rate for the full-duplex TDM Highways has been chosen based on the standard sampling rate of 8 Khz (125 $\mu$s) used in digital telecommunications systems. The resulting synchronous TDM Highway structure, framed at an 8 Khz (125 $\mu$s) rate, is clocked at 4.096 Mhz providing sixty-four (64) DSO (64 Kbps) 8 bit time slots per frame. The 4.096 Mhz TDM Highway bit rate has been selected because it is a multiple of the standard 8 Khz sampling rate (512×8 Khz=4.096 Mhz), thereby providing for a straightforward rate conversion process between the CBR channel bit rate and the TDM Highway transport rate.

The TDM Flow Queues provide the mechanism to synchronize and rate convert the CBR channel data bits between the LAN transport frequency and the transport frequency of the TDM Highway. The Master Clock in the Communications Switching Module (CSM) is used to derive the timing for both the TDM Highway and the generation and transmission of the Master Ethernet Packets. The synchronous nature of the transmission of the Master Ethernet Packets from the CSM to the User Terminal Equipment (UTE) Adapter enables the UTE Adapter to synchronize the transmission of its Master Ethernet Packets to the Master Clock in the CSM. Because the transmissions of the Master Ethernet Packets from the UTE Adapter are synchronized to the Master Clock of the CSM, a fixed timing relationship can be established between the CBR channel data bits arriving at a user port of the CSM and the TDM Highway time slots.

The receiver synchronizes to the incoming Master Ethernet Packets, extracts the CBR channel data bits from the fixed locations within the Master Ethernet Packet payload, and writes them into the storage elements of the TDM Flow Queue. (Note that the term "receiver" used in this context refers to the Media Access Controller (MAC), Ethernet SAR function, and the Timing & Control Logic coupled to the TDM Flow Queues.) In the case of the Type I Master Ethernet Packet, a new series of CBR channel data bits will arrive at the receiver every 250 $\mu$s. In the case of the Type II Master Ethernet Packet, a new series of CBR channel data bits will arrive at the receiver every 125 $\mu$s. The CBR channel data bits are written into the storage elements of the TDM Flow Queue at the rate at which they arrive. The previously written CBR channel data bits must be retrieved from the storage elements of the TDM Flow Queue and transferred to the TDM Highway before the next series of CBR channel data bits arrive or they will be over written by the new data bits.

The frame rate of the TDM Highway and the arrival rate of the Master Ethernet Packets carrying the CBR channel data bits are synchronized to the Master Clock. The synchronization enables a fixed timing relationship to be established for transferring the CBR channel data bits in and out of the TDM Flow Queues. This allows the Timing & Control Logic and the TDM Highway Interface Logic access to the TDM Flow Queue storage elements at fixed but separate points in time. All transfers in and out of the TDM Flow Queue are based on the frame rate of the TDM Highway and the rate at which the CBR channel data bits arrive at the user port of the CSM. In the case of the Type I Master Ethernet Packet, the CBR channel data bits arrive at the user port of the CSM and are transferred into the TDM Flow Queue every 250 µs. In the case of the Type II Master Ethernet Packet, the CBR channel data bits arrive at the user port of the CSM and are transferred into the TDM Flow Queue every 125 µs. In both cases, the CBR channel data bits are transferred out of the TDM Flow Queue at the 125 µs frame rate of the TDM Highway.

Referring again to the Type I Master Ethernet Packet, the CBR channel data bits are transmitted over the LAN segment every 250 µs and, therefore, arrive at one-half the frame rate of the TDM Highway. In this embodiment of the present invention, the TDM Highway Interface Logic accesses the TDM Flow Queue storage elements at the TDM Highway frame rate of 8 Khz (125 µs). Using this 125 µs period of the TDM Highway as a reference, to maintain a continuous flow of CBR channel data bits in a TDM Highway time slot requires that two (2) frames of CBR channel data bits be transported over the LAN segment during each 250 µs CBR channel period of the Type I Master Ethernet Packet. This may appear cumbersome to the casual observer, however, a 250 µs CBR channel transport period was purposely selected for the Type I Master Ethernet Packet in this embodiment of the invention to accommodate the CBR channel transport rate of a traditional Digital Key Telephone terminal. The resulting two-to-one (2:1) difference between the frame rate of the TDM Highway and the CBR channel transport period over the LAN segment is compensated for by controlling the access sequence to the TDM Flow Queue. As previously stated, the TDM Highway must have access to the TDM Flow Queue at a constant frame rate of 8 Khz (125 µs) in order to maintain a continuous flow of CBR channel data bits in the TDM Highway time slots. The Ethernet SAR function extracts the CBR channel data bits from the Master Ethernet Packet at a 250 µs rate and the Timing & Control Logic transfers them to the TDM Flow Queue at that rate. However, two (2) frames of CBR channel data bits are transported over the LAN segment during each 250 µs CBR channel period. Therefore, the Timing & Control Logic transfers both received frames of the CBR channel bits during a single access to the TDM Flow Queue storage elements. In turn, the TDM Highway Interface Logic retrieves one (1) frame of the received CBR channel data bits every 125 µs thereby requiring two (2) accesses to the TDM Flow Queue to retrieve all of the CBR channel data bits written at the 250 µs rate by the Timing & Control Logic.

In another possible embodiment of the present invention, the Type II Master Ethernet Packets are used to transport the CBR channel information over the LAN segment. In the case of the Type I frame, the CBR channel data bits are transmitted over the LAN segment every 125 µs. In this embodiment of the present invention, the TDM Highway Interface Logic accesses the TDM Flow Queue storage elements at the TDM Highway frame rate of 8 Khz (125 µs). The 125 µs period of the TDM Highway is the same as the arrival period of the CBR channel data bits in the received Master Ethernet Packet. Therefore, to maintain a continues flow of CBR channel data bits in a TDM Highway time slot requires that only one (1) frame of CBR channel data bits be transported over the LAN segment during the 125 µs CBR channel period of the Type II Master Ethernet Packet. The Ethernet SAR function extracts the CBR channel data bits from the Master Ethernet Packet at a 125 µs rate and the Timing & Control Logic transfers them to the TDM Flow Queue at that rate. In turn, the TDM Highway Interface Logic retrieves one (1) frame of received CBR channel data bits every 125 µs and sequences them into a time slot, or group of time slots, on the TDM Highway.

For both the Type I and Type II Master Ethernet Packets, the timing for the TDM Highway and the transmission of the Master Ethernet Packets from the UTE Adapter have been derived from the system Master Clock. Therefore, the frame rate of the TDM Highway and the CBR channel arrival rate from the UTE Adapter are synchronized. This enables the start of the Master Ethernet Packet transmission from the UTE Adapter to be placed at a point in time that will cause the arrival of the Received CBR channel data bits to be aligned with the Timing & Control Logic access to the storage elements of the TDM Flow Queue. This is another feature of the present invention.

System Timing Synchronization

To facilitate the transmission of Constant Bit Rate (CBR) channel information over the LAN segment, the timing signals (i.e., the clocks) used to process the CBR channel information in the User Terminal Equipment (UTE) Adapter must be synchronized to the master clock oscillator in the Communications Switching Module (CSM). The timing control for the transmissions of both the Type I and Type II Master Ethernet Packets from the CSM is derived from the master clock oscillator. The transmission of the Master Ethernet Packets from the CSM at a fixed rate provides a timing reference for the UTE Adapter. The locally generated clocks in the UTE Adapter used to process the CBR channel bits are locked to the master clock oscillator in the CSM by this timing reference. This is a feature of the present invention.

The master system clock oscillator is part of the CBR Processing Module on the CBR Processing CPU card. The Master Counter chain divides down the master clock oscillator frequency to generate a succession of Master Clock frequencies. A Master TDM Clock is sourced from the master counter chain and is transmitted to the Ethernet Switch Port cards, and all other user and network interface or processing cards in the system. The Master TDM Clock is selected from the succession of master clocks frequencies derived from the master system clock oscillator. The frequency of the Master TDM Clock is chosen to be two (2) times the frequency of the TDM Highway bit rate to facilitate the generation of local interface card timing signals.

The Ethernet Switch Port card uses the Master TDM Clock sourced from the CBR Processing CPU to generate the local timing signals used to process the CBR channel bits and control the fixed transmission rate of the Type I or Type II Master Ethernet Packets. Because the Master TDM Clock is directly derived from the master clock oscillator, the transmission rate of the Master Ethernet Packets is synchronized to the master clock oscillator. The UTE Adapter is connected to the LAN segment serviced by a user port on the Ethernet Switch Port card. The UTE Adapter receives the Master Ethernet Packets transmitted at a fixed rate, referenced to the master clock oscillator, from the user port of the Ethernet Switch Port card over the LAN segment. There is a small amount of jitter introduced by the Media Access Controllers (MACs) and Physical Interfaces (PHYs) at each end of the LAN segment. However, this jitter is compensated for by the First-In-First-Out (FIFO) memories used to interface the MACs to the packet buffers and by the Timing & Control Logic coupled to the Ethernet Segmentation and Re-assembly (SAR) function used to transfer the CBR channel bits to the TDM Flow Queues.

The UTE adapter uses a Phase Lock Loop (PLL) to lock the locally generated clocks used to process the CBR channel bits and the transmission of the Master Ethernet Packets back to the CSM, to the fixed arrival rate of the Master Ethernet Packets received from the CSM. The fixed transmission rate of Master Ethernet Packets flowing in both directions over the LAN segment (i.e., CSM to UTE Adapter and UTE Adapter to CSM) are synchronized to the system master clock oscillator by the method described above. The CBR channel bits carried in fixed locations within these Master Ethernet Packets also arrive at a fixed rate synchronized to the master clock oscillator in the CSM. These are features of the present invention.

Transfer of the Constant Bit Rate (CBR) Channel Information and Packet Data Information over the LAN Segment As previously described, the Master Ethernet Packets are generated and transmitted at a constant rate to facilitate the transmission of Constant Bit Rate (CBR) Channel information over the LAN segment. The CBR Channel information is encapsulated into the Master Ethernet Packet by the segmentation portion of the Ethernet Segmentation and Re-assembly (SAR) function at fixed locations within the frame.

In one possible embodiment of the invention, 10 Mbps Ethernet (10Base-T) master packets (i.e., Type I) are used. In this case, the segmentation portion of the Ethernet SAR encapsulates the CBR channel information into fixed locations within the frame at 250 μs intervals. These fixed locations are distributed such that the last 250 μs interval within a frame is spaced 250 μs from the first 250 μs interval in the next frame, taking into account the standard Ethernet Inter Packet Gap (IPG) requirement. Through this process, the Master Timing Logic of the Communications Switching Module (CSM) is able to transmit the CBR Channel information bytes to the MAC (Media Access Controller) on the associated user port in a synchronous Time Domain Multiplexed (TDM) manner. The remainder of the Master Ethernet Packet payload bytes are available for the transmission of user data packet information. The Ethernet SAR function monitors the traffic flows from the User Packet Flow Queues and encapsulates the user data packets into the remaining payload bytes of the Master Ethernet Packets. As part of the user data packet encapsulation process, the segmentation portion of the Ethernet SAR function may have to segment the user data packets into the available payload bytes between the fixed 250 μs intervals carrying the CBR Channel information. It may also be necessary for the segmentation portion of the Ethernet SAR function to segment the user data packets into more than one (1) Master Ethernet Packet.

This embodiment of the invention has shown apparatus and method for establishing the transmission of CBR channel information bytes to the MAC of a user port on the CSM in a synchronous TDM manner.

In another possible embodiment of the present invention, the CBR Channel is used for the transmission of PCM and Digital Key Telephone Signaling information bytes. The resulting transmission of the Master Ethernet Packet, over the LAN segment serviced by the user port, to the user terminal equipment attached to the segment (in this embodiment the Digital Key Telephone) retains its synchronous TDM characteristics. However, unless the Digital Key Telephone is capable of synchronizing to the Master Ethernet Packet the TDM characteristics of the link will be lost. In addition, the user terminal equipment must be capable of correctly extracting the CBR channel information and user data packet information from the Master Ethernet Packet.

Therefore, the Digital Key Telephone requires an Ethernet SAR function compatible with the Ethernet SAR function used in the CSM to format the Master Ethernet Packet.

The Digital Key Telephone must first synchronize its internal Master Time Base to the Master Ethernet Packets it is receiving from the LAN segment. Once synchronized, the re-assembly portion of the Ethernet SAR function can be used to extract the PCM, signaling and user data packet information. The PCM bytes can then be processed through a local TDM Flow Queue and passed to the Digital Key Telephone CODEC (Coder/Decoder) for conversion to analog voice signals. The signaling information is also processed through the local TDM Flow Queue and passed to the Digital Key Telephone signaling circuitry. The encapsulated user data packets are extracted from the received Master Ethernet Packets and reassembled into their original form. The packets can then be transferred through the User Packet Flow Queue to the Ethernet user port on the Digital Key Telephone.

In order to function in the described system, the Digital Key Telephone must be modified by incorporating the Ethernet SAR function and means to synchronize its Master Time Base, using techniques described in further detail in the sections entitled "System Timing Synchronization" and "Ethernet Segmentation and Re-assembly (SAR)". Also it is understood that the modified Digital Key Telephone may be further modified to incorporate the UTE Adapter, so that other Ethernet supported devices may be simply plugged into one or more suitable receptacles on the telephone instrument.

The apparatus and methods disclosed in the application will be readily understood and carried out by one skilled in the telecommunications, data communications and Ethernet networking arts using conventional components and programming techniques. An overall basic description of networking concepts and standard Ethernet packets is found in *A Guide to Networking Essentials* by Tittel and Johnson, published by Course Technology, International Thompson Publishing Company, 1998, ISBN 0-7600-5097-X. A description of Ethernet switching technology is found in *Switching Technology in the Local Network—From LAN to Switched LAN to Virtual LAN*, by Hein and Griffiths, published by International Thompson Computer Press, 1997, ISBN 1-85032-166-3. A description of synchronous TDM, and digital telephone switching principles may be found in *Data and Computer Communications* by William Stalling, published by Macmillan, ISBN 0-02-415440-7. All of the above texts are incorporated herein by reference.

What is claimed is:

1. A communication switching module (CSM) to be used for common switching equipment in a local area network (LAN) adapted for packet switching of Ethernet packets, said CSM comprising:

a plurality of Ethernet switch cards each having a plurality of user ports and first switching means for directing said Ethernet packets to and from selected user ports, means for segmentation and reassembly (SAR) of said Ethernet packets received by and transmitted to the user ports operatively connected to said first switching means, said SAR means being adapted to segment received data of a first delay-sensitive data type and received data of a second non-delay sensitive data type, to encapsulate the segmented data into master Ethernet packets at fixed locations in said master Ethernet packets according to data type, to extract segments of the first and second data types from said packets, and to re-assemble the extracted segments into the first and second data types, and to transmit said master Ethernet packets at a selected constant rate, time domain multiplexing (TDM) means connected to the SAR means for synchronous processing of data of said first data type, and second switching means connected to the SAR means for asynchronous processing of data of said second data type.

2. Apparatus according to claim 1, wherein the time domain multiplexing means comprises a plurality of TDM flow queues, a full duplex TDM backplane highway interfaced with said TDM flow queues, and a constant bit rate (CBR) processing module interfaced with the TDM backplane highway.

3. Apparatus according to claim 1, wherein the second switching means comprises a plurality of packet flow queues, a high speed full duplex packet bus interfaced with said packet flow queues, and an Ethernet switch fabric card interfaced with said packet bus.

4. Apparatus according to claim 3, wherein the Ethernet switch fabric card comprises a cut-through Ethernet switch.

5. Apparatus according to claim 1, where the first switching means comprises a store-and forward Ethernet switch.

6. Apparatus according to claim 1, including at least one wide area network (WAN) interface card having at least one port connectable for full duplex high speed digital data service transmission, said WAN interface card being connected to the SAR means.

7. Apparatus according to claim 1, wherein the SAR means is adapted to segment data of the first data type into segments having a selected fixed number of octets and to encapsulate each first data type segment into said master Ethernet packet at a selected fixed location.

8. Apparatus according to claim 7, wherein the SAR means is adapted to segment data of the second data type into segments having said selected fixed number of octets and to encapsulate each segment of the second data type into a master Ethernet packet at a fixed location contiguous to a said segment of the first data type.

9. Apparatus according to claim 1, wherein the SAR means is adapted to extract segments of the first data type from said master Ethernet packets and to re-assemble data of the first data type and forward it to said TDM means.

10. Apparatus according to claim 9, wherein the SAR means is adapted to extract segments of the second data type and to re-assemble data of the second type and forward it to said second switching means.

* * * * *